United States Patent
Kawaguchi et al.

(10) Patent No.: US 10,124,440 B2
(45) Date of Patent: Nov. 13, 2018

(54) LASER MACHINING DEVICE AND LASER MACHINING METHOD

(71) Applicant: HAMAMATSU PHOTONICS K.K., Hamamatsu-shi, Shizuoka (JP)

(72) Inventors: Daisuke Kawaguchi, Hamamatsu (JP); Makoto Nakano, Hamamatsu (JP); Ryota Sugio, Hamamatsu (JP); Tsubasa Hirose, Hamamatsu (JP); Keisuke Araki, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 335 days.

(21) Appl. No.: 14/778,766

(22) PCT Filed: Mar. 13, 2014

(86) PCT No.: PCT/JP2014/056728
§ 371 (c)(1),
(2) Date: Sep. 21, 2015

(87) PCT Pub. No.: WO2014/156692
PCT Pub. Date: Oct. 2, 2014

(65) Prior Publication Data
US 2016/0052088 A1 Feb. 25, 2016

(30) Foreign Application Priority Data

Mar. 27, 2013 (JP) ................. 2013-065978
Mar. 27, 2013 (JP) ................. 2013-065987
Mar. 27, 2013 (JP) ................. 2013-065990

(51) Int. Cl.
*B23K 26/06* (2014.01)
*B23K 26/00* (2014.01)
(Continued)

(52) U.S. Cl.
CPC ...... *B23K 26/0624* (2015.10); *B23K 26/0006* (2013.01); *B23K 26/0057* (2013.01);
(Continued)

(58) Field of Classification Search
CPC ............ B23K 26/0624; B23K 26/0057; B23K 26/0643; B23K 26/0648; B23K 26/53
(Continued)

(56) References Cited

U.S. PATENT DOCUMENTS 5,490,849 A 2/1996 Smith
9,636,773 B2 5/2017 Bovatsek et al.
(Continued)

FOREIGN PATENT DOCUMENTS

CN 1967783 5/2007
CN 101346207 1/2009
(Continued)

OTHER PUBLICATIONS

International Preliminary Report on Patentability dated Oct. 8, 2015 for PCT/JP2014/056723.
(Continued)

*Primary Examiner* — Samuel M Heinrich
(74) *Attorney, Agent, or Firm* — Drinker Biddle & Reath LLP

(57) ABSTRACT

A laser processing device forms a modified region in an object to be processed by converging ultrashort pulse laser light at the object and comprises a laser light source emitting the laser light, a converging optical system converging the laser light emitted from the laser light source at the object, and an aberration providing part imparting an aberration to the laser light converged at the object by the converging optical system. In an optical axis direction of the laser light, letting a reference aberration range be a range of a converging-induced aberration as an aberration occurring at a posi-
(Continued)

tion where the laser light is converged as a result of converging the laser light at the object, the aberration providing part imparts a first aberration to the laser light such that the laser light has an elongated range longer than the reference aberration range in the optical axis direction as an aberration range and an intensity distribution in the optical axis direction with a continuous undulation in the elongated range.

14 Claims, 28 Drawing Sheets

(51) Int. Cl.
  B23K 26/53    (2014.01)
  B23K 26/0622  (2014.01)
  B23K 26/03    (2006.01)
  B23K 26/08    (2014.01)
  B23K 26/064   (2014.01)
  B23K 103/00   (2006.01)

(52) U.S. Cl.
  CPC .......... *B23K 26/03* (2013.01); *B23K 26/064* (2015.10); *B23K 26/0643* (2013.01); *B23K 26/0648* (2013.01); *B23K 26/0853* (2013.01); *B23K 26/53* (2015.10); *B23K 2203/52* (2015.10); *B23K 2203/54* (2015.10); *B23K 2203/56* (2015.10)

(58) Field of Classification Search
  USPC ........................................ 219/121.6–121.86
  See application file for complete search history.

(56) References Cited

U.S. PATENT DOCUMENTS

| | | | |
|---|---|---|---|
| 2009/0128824 A1 | 5/2009 | Leitgeb et al. | |
| 2010/0025387 A1 | 2/2010 | Arai et al. | |
| 2011/0000897 A1* | 1/2011 | Nakano | B23K 26/0057 219/121.72 |
| 2012/0095533 A1 | 4/2012 | Wang | |
| 2012/0234807 A1 | 9/2012 | Sercel et al. | |
| 2015/0158120 A1 | 6/2015 | Courvoisier et al. | |
| 2015/0165548 A1 | 6/2015 | Marjanovic et al. | |
| 2015/0166395 A1 | 6/2015 | Marjanovic et al. | |
| 2015/0343562 A1 | 12/2015 | Hirose et al. | |

FOREIGN PATENT DOCUMENTS

| | | |
|---|---|---|
| CN | 101516566 | 8/2009 |
| CN | 101772398 | 7/2010 |
| CN | 101784364 | 7/2010 |
| CN | 101861228 | 10/2010 |
| CN | 101965242 | 2/2011 |
| CN | 102307699 | 1/2012 |
| CN | 102725096 | 10/2012 |
| CN | 102741011 | 10/2012 |
| JP | 2005-262290 | 9/2005 |
| JP | 2006-130691 A | 5/2006 |
| JP | 2010-058128 | 3/2010 |
| JP | 2010-075997 | 4/2010 |
| JP | 2011-002698 A | 1/2011 |
| JP | 2011-051011 A | 3/2011 |
| JP | 2011-056544 | 3/2011 |
| JP | 2011-517299 | 6/2011 |
| JP | 2012-096274 | 5/2012 |
| JP | 2012-146877 | 8/2012 |
| JP | 2012-196711 | 10/2012 |
| JP | 2013-043204 | 3/2013 |
| TW | 200711775 | 4/2007 |
| TW | 200732078 | 9/2007 |
| TW | 201043378 | 12/2010 |
| TW | 201200279 | 1/2012 |
| WO | WO 2009/114375 | 9/2009 |
| WO | WO-2013/039162 A1 | 3/2013 |

OTHER PUBLICATIONS

International Preliminary Report on Patentability dated Oct. 8, 2015 for PCT/JP2014/056724.
International Preliminary Report on Patentability dated Oct. 8, 2015 for PCT/JP2014/056725.
International Preliminary Report on Patentability dated Oct. 8, 2015 for PCT/JP2014/056726.
International Preliminary Report on Patentability dated Oct. 8, 2015 for PCT/JP2014/056728.

* cited by examiner

Fig. 13
(a)
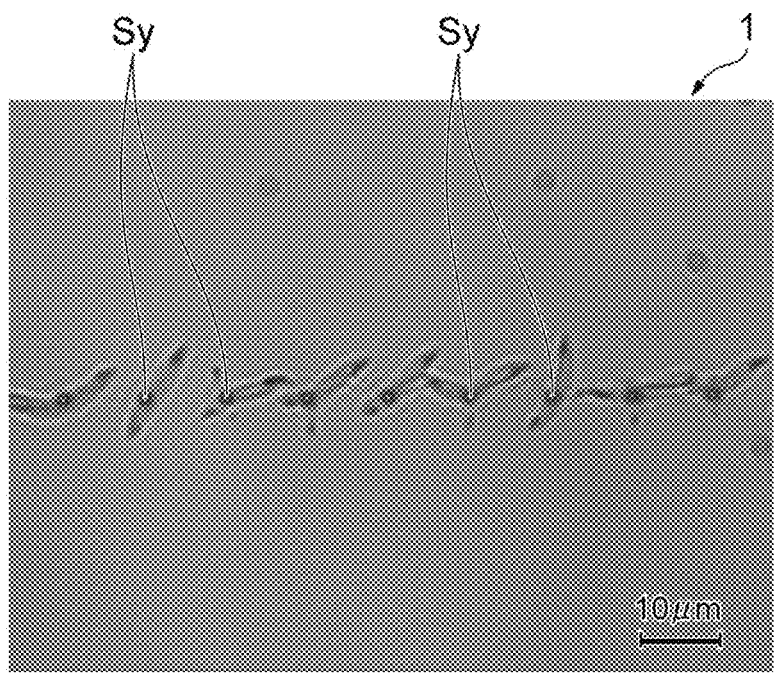
(b)
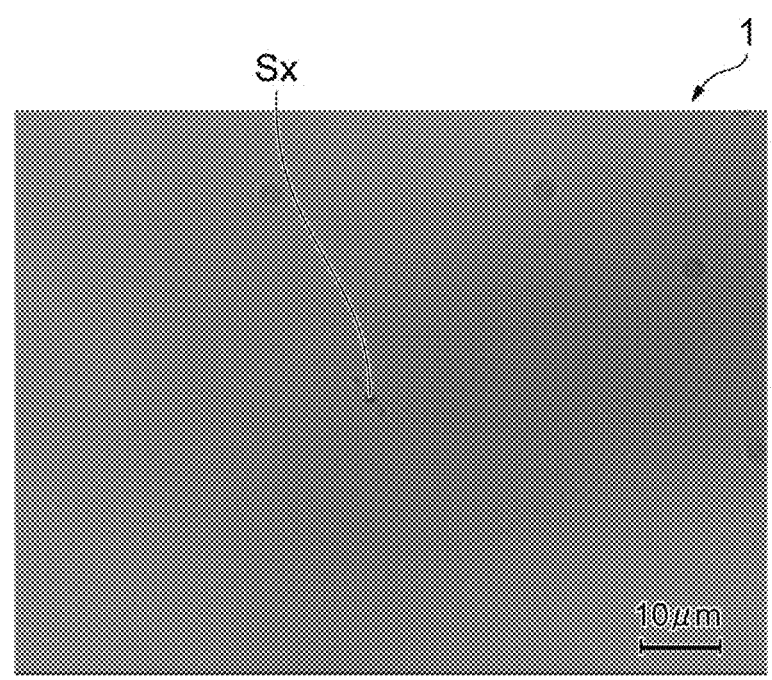

Fig. 14
(a)
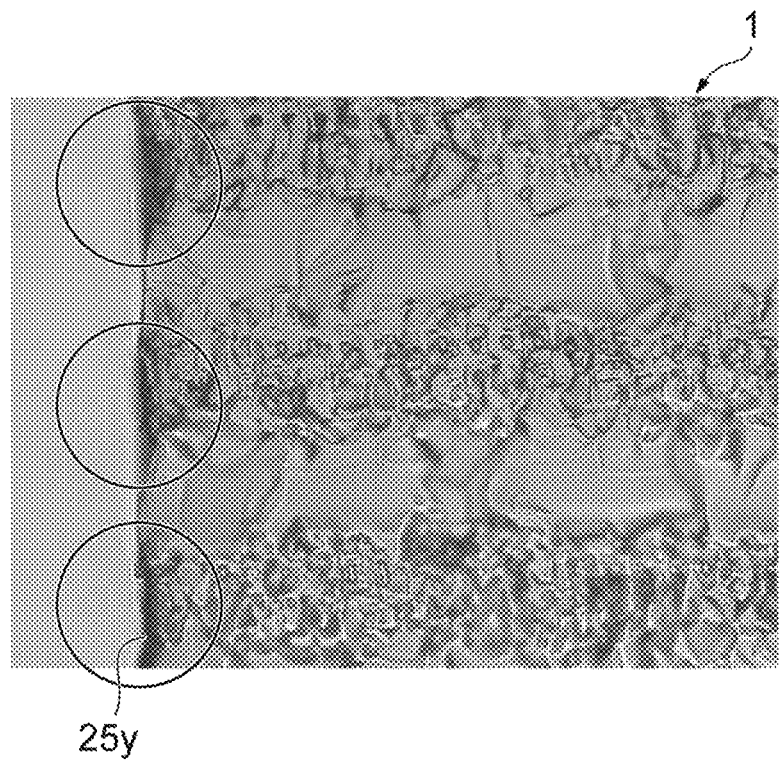
25y
(b)
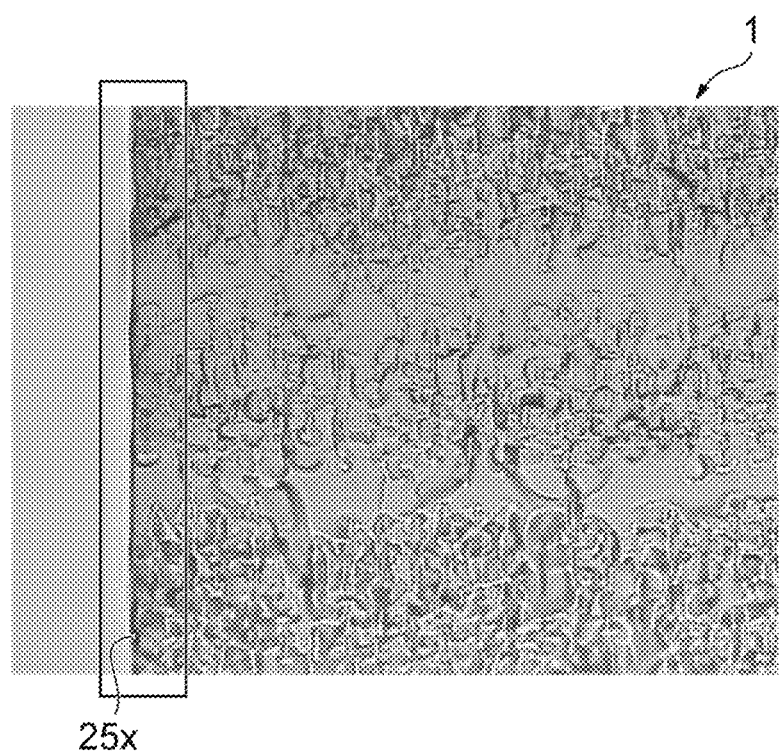
25x

*Fig.16*
(a)
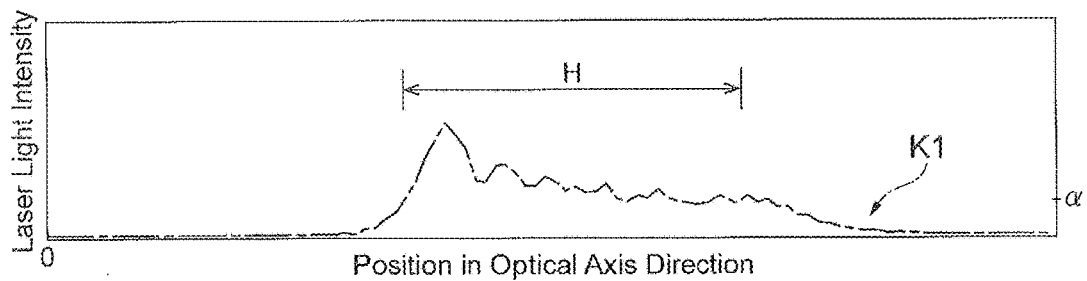
(b)
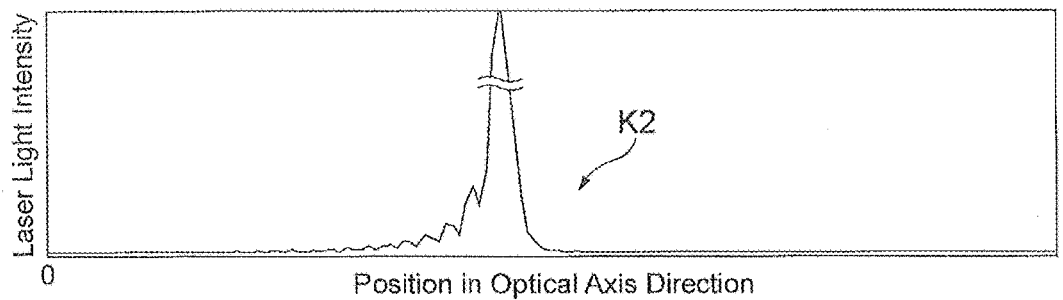
(c)
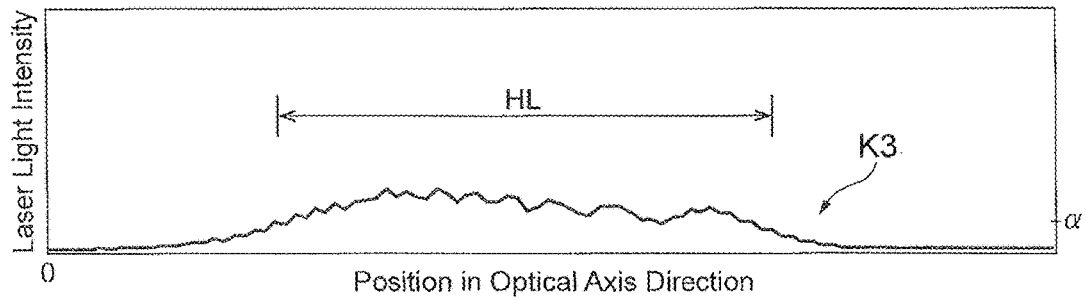

| Processing depth | $Z_1$ | $Z_2$ | $Z_3$ |
|---|---|---|---|
| Reference aberration range | $H_1$ | $H_2$ | $H_3$ |

(b)

Tb2

| | Processing length $X_1$ | Processing length $X_2$ | Processing length $X_3$ |
|---|---|---|---|
| Reference aberration range $H_1$ | modulation pattern $A_{1,1}$ | modulation pattern $A_{1,2}$ | modulation pattern $A_{1,3}$ |
| Reference aberration range $H_2$ | modulation pattern $A_{2,1}$ | modulation pattern $A_{2,2}$ | modulation pattern $A_{2,3}$ |
| Reference aberration range $H_3$ | modulation pattern $A_{3,1}$ | modulation pattern $A_{3,2}$ | modulation pattern $A_{3,3}$ |

Fig.20
(a)
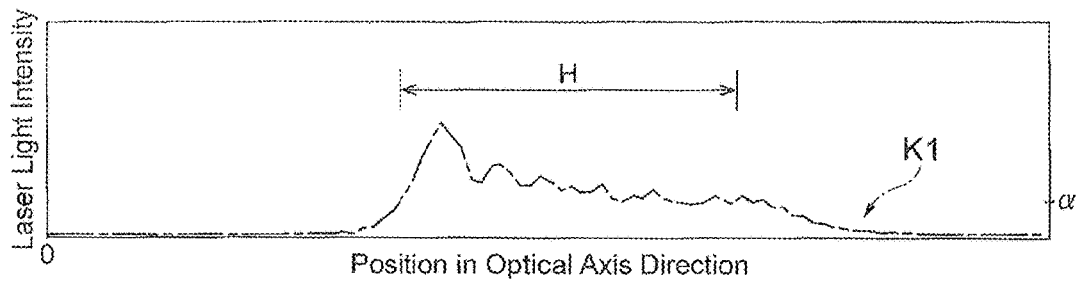
(b)
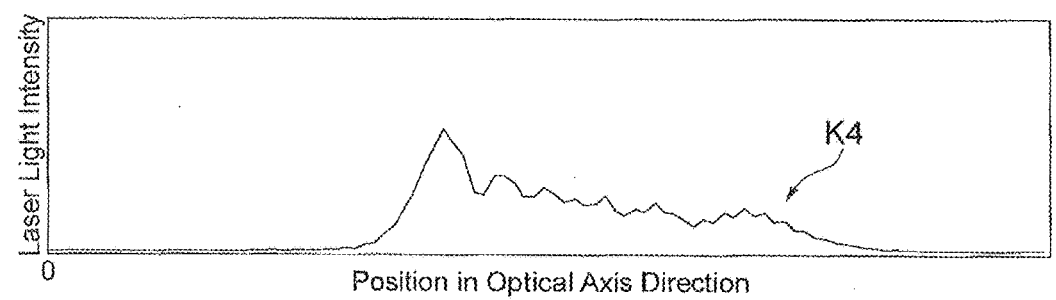
(c)
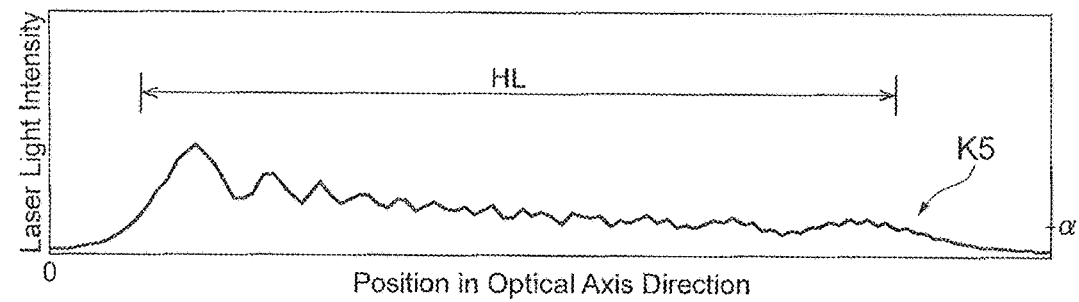

Fig.23
(a)
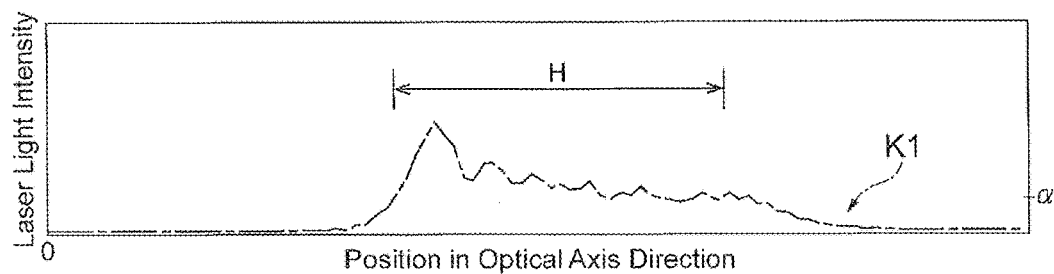
(b)
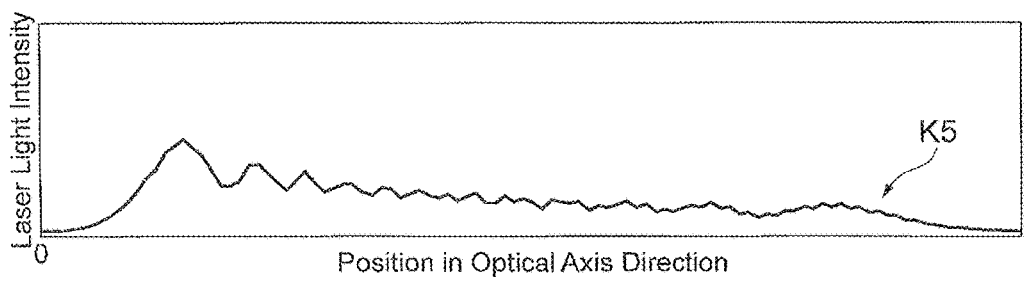
(c)
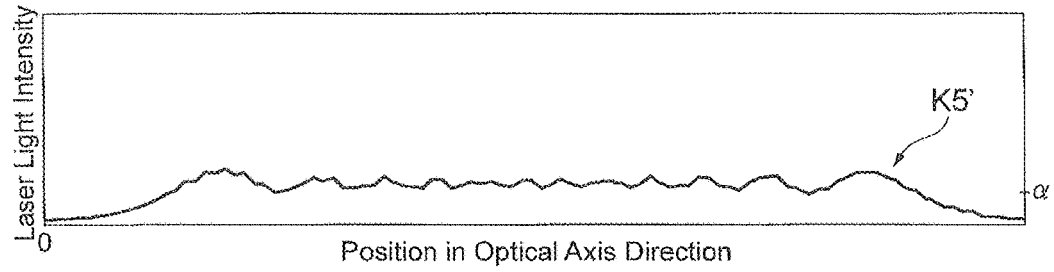

| | Processing depth $Z_1$ | Processing depth $Z_2$ | Processing depth $Z_3$ |
|---|---|---|---|
| Processing length $X_1$ | unnecessary component amount $F_{1,1}$ modulation pattern $A_{1,1}$ | unnecessary component amount $F_{1,2}$ modulation pattern $A_{1,2}$ | unnecessary component amount $F_{1,3}$ modulation pattern $A_{1,3}$ |
| Processing length $X_2$ | unnecessary component amount $F_{2,1}$ modulation pattern $A_{2,1}$ | unnecessary component amount $F_{2,2}$ modulation pattern $A_{2,2}$ | unnecessary component amount $F_{2,3}$ modulation pattern $A_{2,3}$ |
| Processing length $X_3$ | unnecessary component amount $F_{3,1}$ modulation pattern $A_{3,1}$ | unnecessary component amount $F_{3,2}$ modulation pattern $A_{3,2}$ | unnecessary component amount $F_{3,3}$ modulation pattern $A_{3,3}$ |

Fig.26
(a)
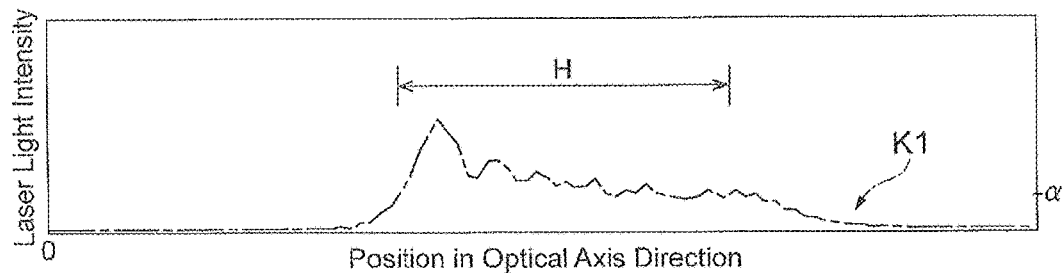
(b)
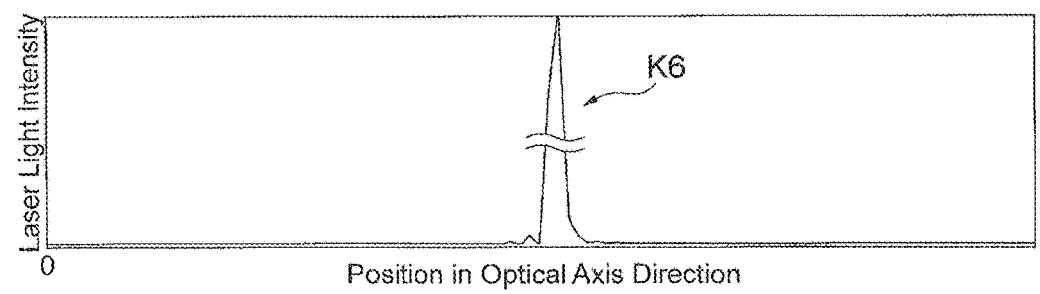
(c)
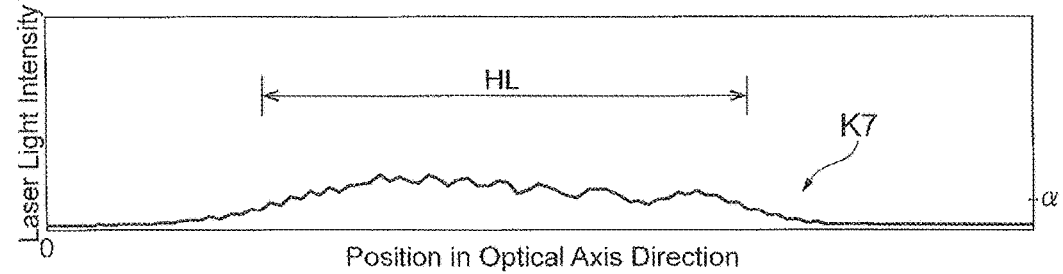

| Processing depth | $Z_1$ | $Z_2$ | $Z_3$ |
|---|---|---|---|
| Correction amount | $Q_1$ | $Q_2$ | $Q_3$ |

(b)

Tb5

| | Processing length $X_1$ | Processing length $X_2$ | Processing length $X_3$ |
|---|---|---|---|
| Correction amount $Q_1$ | modulation pattern $A_{1,1}$ | modulation pattern $A_{1,2}$ | modulation pattern $A_{1,3}$ |
| Correction amount $Q_2$ | modulation pattern $A_{2,1}$ | modulation pattern $A_{2,2}$ | modulation pattern $A_{2,3}$ |
| Correction amount $Q_3$ | modulation pattern $A_{3,1}$ | modulation pattern $A_{3,2}$ | modulation pattern $A_{3,3}$ |

LASER MACHINING DEVICE AND LASER MACHINING METHOD

TECHNICAL FIELD

One aspect of the present invention relates to a laser processing device and a laser processing method.

BACKGROUND ART

Known as a conventional laser processing device is one which converges laser light at an object to be processed, so as to form a modified region within the object along a line to cut (see, for example, Patent Literature 1). In such a laser processing device, a spatial light modulator modulates laser light emitted from a laser light source to the object, so as to converge the laser light at a plurality of positions in the object.

CITATION LIST

Patent Literature

Patent Literature 1: Japanese Patent Application Laid-Open No. 2011-51011

SUMMARY OF INVENTION

Technical Problem

The above-mentioned conventional technique has been demanded to improve processing quality along with its wide-spreading use in recent years. For example, there have been demands for ameliorating straightness in cut sections concerning the object cut from modified regions acting as start points and for laser processing which can suppress adverse effects (fractures in cleavage planes and the like) caused by the cleavage characteristic and crystal orientation of the object.

In view of the foregoing circumstances, it is an object of one aspect of the present invention to provide a laser processing device and laser processing method which can improve the processing quality.

Solution to Problem

The laser processing device in accordance with one aspect of the present invention is a laser processing device forming a modified region in an object to be processed by converging ultrashort pulse laser light at the object, the laser processing device comprising a laser light source emitting the laser light, a converging optical system converging the laser light emitted from the laser light source at the object, and an aberration providing part imparting an aberration to the laser light converged at the object by the converging optical system; in an optical axis direction of the laser light, letting a reference aberration range be a range of a converging-induced aberration as an aberration occurring at a position where the laser light is converged as a result of converging the laser light at the object, the aberration providing part imparts a first aberration to the laser light such that the laser light has an elongated range longer than the reference aberration range in the optical axis direction as an aberration range and an intensity distribution in the optical axis direction with a continuous undulation in the elongated range.

The laser processing method in accordance with one aspect of the present invention is a laser processing method for forming a modified region in an object to be processed by converging ultrashort pulse laser light at the object, the laser processing method comprising the steps of emitting the laser light from a laser light source and converging the emitted laser light at the object, and imparting an aberration to the laser light converged at the object; in an optical axis direction of the laser light, letting a reference aberration range be a range of a converging-induced aberration as an aberration occurring at a position where the laser light is converged as a result of converging the laser light at the object, the step of imparting the aberration to the laser light imparts a first aberration to the laser light such that the laser light has an elongated range longer than the reference aberration range in the optical axis direction as an aberration range and an intensity distribution in the optical axis direction with a continuous undulation in the elongated range.

In the laser processing device and laser processing method, an object to be processed is laser-processed by ultrashort pulse laser light having an elongated range longer than a reference aberration range as an aberration range and an intensity distribution in the optical axis direction with a continuous undulation in the elongated range. This can effectively elongate the converged part of the ultrashort pulse laser light in the optical axis direction of the laser light in the object, so as to form a modified region which is elongated in the optical axis direction of the laser light (hereinafter referred to as "vertically long"). This can ameliorate the straightness in cut sections and suppress adverse effects caused by the cleavage characteristic and crystal orientation of the object, thereby improving the processing quality.

In the laser processing device in accordance with one aspect of the present invention, the aberration providing part may impart the first aberration to the laser light so as to form converging points of the laser light at a plurality of positions juxtaposed close to each other along the optical axis direction. In the laser processing method in accordance with one aspect of the present invention, the step of imparting the aberration to the laser light may impart the first aberration to the laser light so as to form converging points of the laser light at a plurality of positions juxtaposed close to each other along the optical axis direction. In this case, the converging points can become a plurality of spots juxtaposed close to each other in the optical axis direction, thereby making it possible to form a perforation-like modified region as a vertically long modified region. This can make it easier for the object to be cut along the modified region. Thus converging light at a plurality of spots can also perform laser processing by an amount of energy smaller than that used for converging light at one vertically long converging spot.

In the laser processing device in accordance with one aspect of the present invention, the aberration providing part may provide an aberration caused by a phase modulation achieving an action of an axicon lens as the first aberration. In the laser processing method in accordance with one aspect of the present invention, the step of imparting the aberration to the laser light may provide an aberration caused by a phase modulation achieving an action of an axicon lens as the first aberration. Thus adding the aberration caused by a phase modulation achieving an action of an axicon lens enables the laser light converged at the object to expand the aberration range to an elongated range and have an intensity distribution in the optical axis direction with a continuous undulation in the elongated range.

In the laser processing device in accordance with one aspect of the present invention, the aberration providing part may impart a predetermined spherical aberration as the first aberration to the laser light. In the laser processing method in accordance with one aspect of the present invention, the step of imparting the aberration to the laser light may provide a predetermined spherical aberration as the first aberration. Thus adding the predetermined spherical aberration enables the laser light converged at the object to expand the aberration range to an elongated range and have an intensity distribution in the optical axis direction with a continuous undulation in the elongated range.

In the laser processing device in accordance with one aspect of the present invention, the aberration providing part may remove or adjust an unnecessary component causing unevenness in the intensity distribution contained in the aberration. In the laser processing method in accordance with one aspect of the present invention, the step of imparting the aberration to the laser light may remove or adjust an unnecessary component causing unevenness in the intensity distribution contained in the aberration. This can homogenize the intensity distribution of the laser light in the optical axis direction by eliminating its unevenness.

In the laser processing device in accordance with one aspect of the present invention, the aberration providing part may impart a second aberration concerning an aberration correction for correcting the converging-induced aberration to the laser light. In the laser processing method in accordance with one aspect of the present invention, the step of imparting the aberration to the laser light may impart a second aberration concerning an aberration correction for correcting the converging-induced aberration to the laser light.

In the laser processing device and laser processing method in accordance with one aspect of the present invention, the object may contain glass, while the ultrashort pulse laser light may have a pulse width of 100 ps or less. The object containing glass may thus be laser-processed with ultrashort pulse laser light having a pulse width of 100 ps or less.

Advantageous Effects of Invention

One aspect of the present invention can provide a laser processing device and laser processing method which can improve the processing quality.

BRIEF DESCRIPTION OF DRAWINGS

FIG. 13 is a photograph for explaining effects of the laser processing method in accordance with the first embodiment;
FIG. 14 is another photograph for explaining effects of the laser processing method in accordance with the first embodiment;
FIG. 16 is a chart for explaining intensity distributions of laser light in the optical axis direction in the first embodiment;
FIG. 17 is a chart illustrating an example of data tables stored in a controller of the first embodiment;
FIG. 20 is a chart for explaining the intensity distribution of laser light in the optical axis direction in a second embodiment;
FIG. 23 is a chart for explaining intensity distributions of laser light in the optical axis direction in a third embodiment;
FIG. 24 is a chart illustrating an example of data tables stored in the controller of the third embodiment;
FIG. 26 is a chart for explaining intensity distributions of laser light in the optical axis direction in a fourth embodiment;
FIG. 27 is a chart illustrating an example of data tables stored in the controller of the fourth embodiment.

DESCRIPTION OF EMBODIMENTS

In the following, preferred embodiments in accordance with one aspect of the present invention will be explained in detail with reference to the drawings. In the following explanations, the same or equivalent constituents will be referred to with the same signs while omitting their overlapping descriptions.

The laser processing device and laser processing method in accordance with an embodiment converges laser light at an object to be processed with laser light, so as to form a modified region along a line to cut. Therefore, the forming of the modified region will be explained at first with reference to FIGS. 1 to 6.

Figure 1:
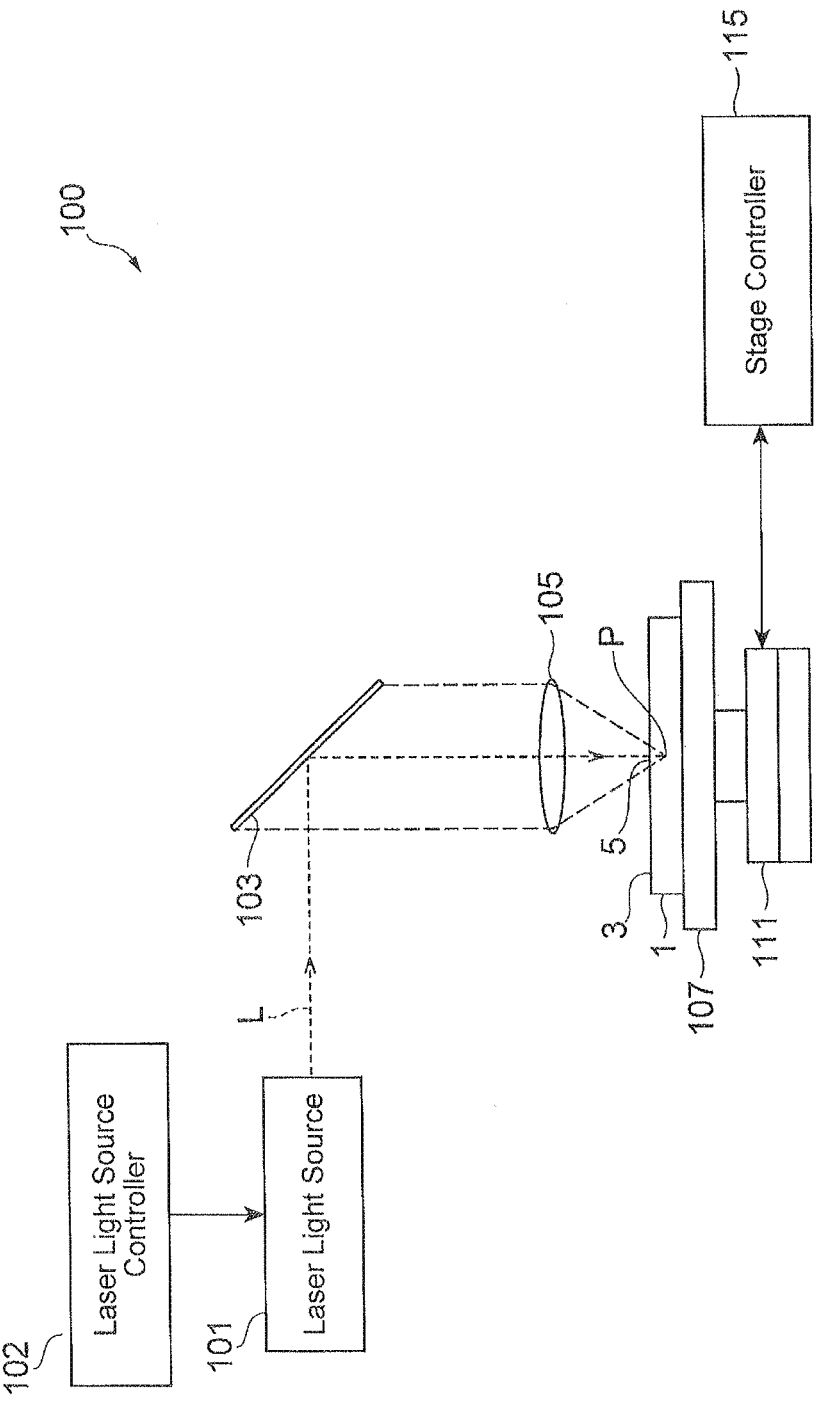
FIG. 1 is a schematic structural diagram of a laser processing device used for forming a modified region.

As illustrated in FIG. 1, a laser processing device 100 comprises a laser light source 101 for causing laser light L to oscillate in a pulsating manner, a dichroic mirror 103 arranged such as to change the direction of the optical axis (optical path) of the laser light L by 90°, and a converging lens 105 for converging the laser light L. The laser processing device 100 further comprises a support table 107 for supporting an object to be processed 1 which is irradiated with the laser light L converged by the converging lens 105, a stage 111 for moving the support table 107, a laser light source controller 102 for regulating the laser light source 101 in order to adjust the output, pulse width, pulse waveform, and the like of the laser light L, and a stage controller 115 for regulating the movement of the stage 111.

In the laser processing device 100, the laser light L emitted from the laser light source 101 changes the direction of its optical axis by 90° with the dichroic mirror 103 and then is converged by the converging lens 105 into the object 1 mounted on the support table 107. At the same time, the stage 111 is shifted, so that the object 1 moves relative to the laser light L along a line to cut 5. This forms a modified region in the object 1 along the line 5. While the stage 111 is shifted here for relatively moving the laser light L, the converging lens 105 may be shifted instead or together therewith.

Figure 2:
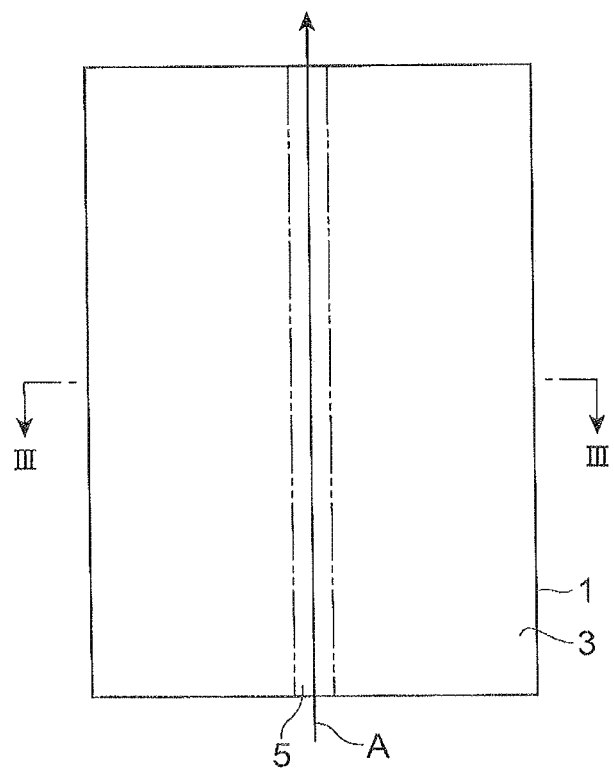
FIG. 2 is a plan view of an object to be processed for which the modified region is formed.
Figure 3:
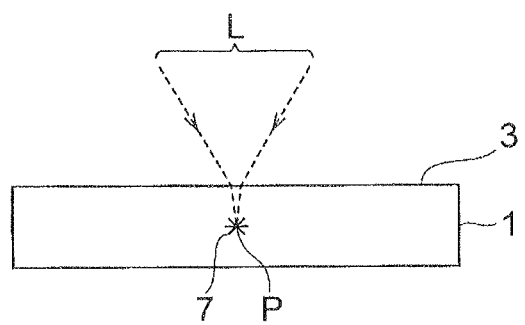
FIG. 3 is a sectional view of the object taken along the line III-III of FIG. 2.
Figure 4:
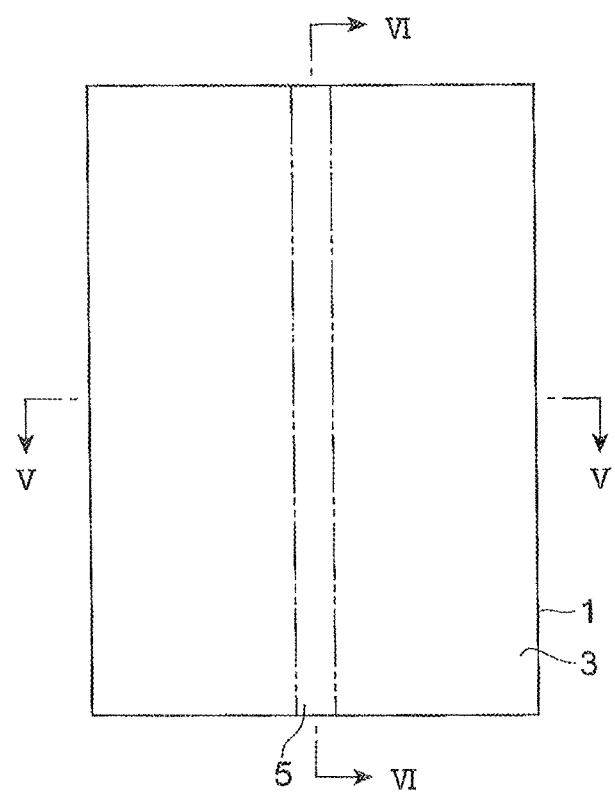
FIG. 4 is a plan view of the object after laser processing.
Figure 5:
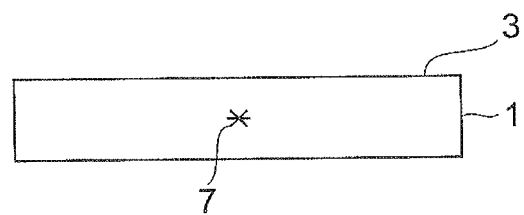
FIG. 5 is a sectional view of the object taken along the line V-V of FIG. 4.
Figure 6:
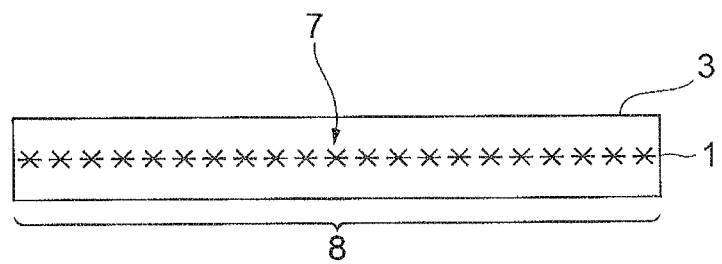
FIG. 6 is a sectional view of the object taken along the line VI-VI of FIG. 4.

Employed as the object 1 is a planar member (e.g., a substrate or a wafer), examples of which include semiconductor substrates formed of semiconductor materials and piezoelectric substrates formed of piezoelectric materials. As illustrated in FIG. 2, the line 5 for cutting the object 1 is set in the object 1. The line 5 is a virtual line extending straight. When forming a modified region within the object 1, the laser light L is relatively moved along the line 5 (i.e., in the direction of arrow A in FIG. 2) while locating a converging point P within the object 1 as illustrated in FIG. 3. This forms a modified region 7 within the object 1 along the line 5 as illustrated in FIGS. 4 to 6, whereby the modified region 7 formed along the line 5 becomes a cutting start region 8.

The converging point P is a position at which the laser light L is converged. The line 5 may be curved instead of being straight, a three-dimensional one combining them, or one specified by coordinates. The line 5 may be one actually drawn on a front face 3 of the object 1 without being restricted to the virtual line. The modified region 7 may be formed either continuously or intermittently. The modified region 7 may be formed either in rows or dots and is only required to be formed at least within the object 1. There are cases where fractures are formed from the modified region 7 acting as a start point, and the fractures and modified region 7 may be exposed at outer surfaces (the front face 3, rear face 21, and outer peripheral surface) of the object 1. The laser light entrance surface for forming the modified region 7 is not limited to the front face 3 of the object 1 but may be the rear face 21 of the object 1.

Here, the laser light L is absorbed in particular in the vicinity of the converging point within the object 1 while being transmitted therethrough, whereby the modified region 7 is formed in the object 1 (i.e., internal absorption type laser processing). Therefore, the front face 3 of the object 1 hardly absorbs the laser light L and thus does not melt. In the case of forming a removing part such as a hole or groove by melting it away from the front face 3 (surface absorption type laser processing), the processing region gradually progresses from the front face 3 side to the rear face side in general.

By the modified region 7 formed in this embodiment are meant regions whose physical characteristics such as density, refractive index, and mechanical strength have attained states different from those of their surroundings. Examples of the modified region 7 include molten processed regions (meaning at least one of regions resolidified after having been once molten, those in the molten state, and those in the process of resolidifying from the molten state), crack regions, dielectric breakdown regions, refractive index changed regions, and their mixed regions. Other examples of the modified region include areas where the density of the modified region has changed from that of an unmodified region and areas formed with a lattice defect in a material of the object (which may also collectively be referred to as high-density transitional regions).

The molten processed regions, refractive index changed regions, areas where the modified region has a density different from that of the unmodified region, or areas formed with a lattice defect may further incorporate a fracture (cut or microcrack) therewithin or at an interface between the modified and unmodified regions. The incorporated fracture may be formed over the whole surface of the modified region or in only a part or a plurality of parts thereof. Examples of the object 1 include those containing or made of silicon (Si), glass, silicon carbide (SiC), $LiTaO_3$, and sapphire ($Al_2O_3$).

This embodiment forms a plurality of modified spots (processing scars) along the line 5, thereby producing the modified region 7. The modified spots, each of which is a modified part formed by a shot of one pulse of pulsed laser light (i.e., one pulse of laser irradiation; laser shot), gather to yield the modified region 7. Examples of the modified spots include crack spots, molten processed spots, refractive index changed spots, and those in which at least one of them is mixed. As for the modified spots, their size and lengths of fractures occurring therefrom can be controlled as necessary in view of the required cutting accuracy, the demanded flatness of cut surfaces, the thickness, kind, and crystal orientation of the object, and the like.

The first embodiment will now be explained.

Figure 7:
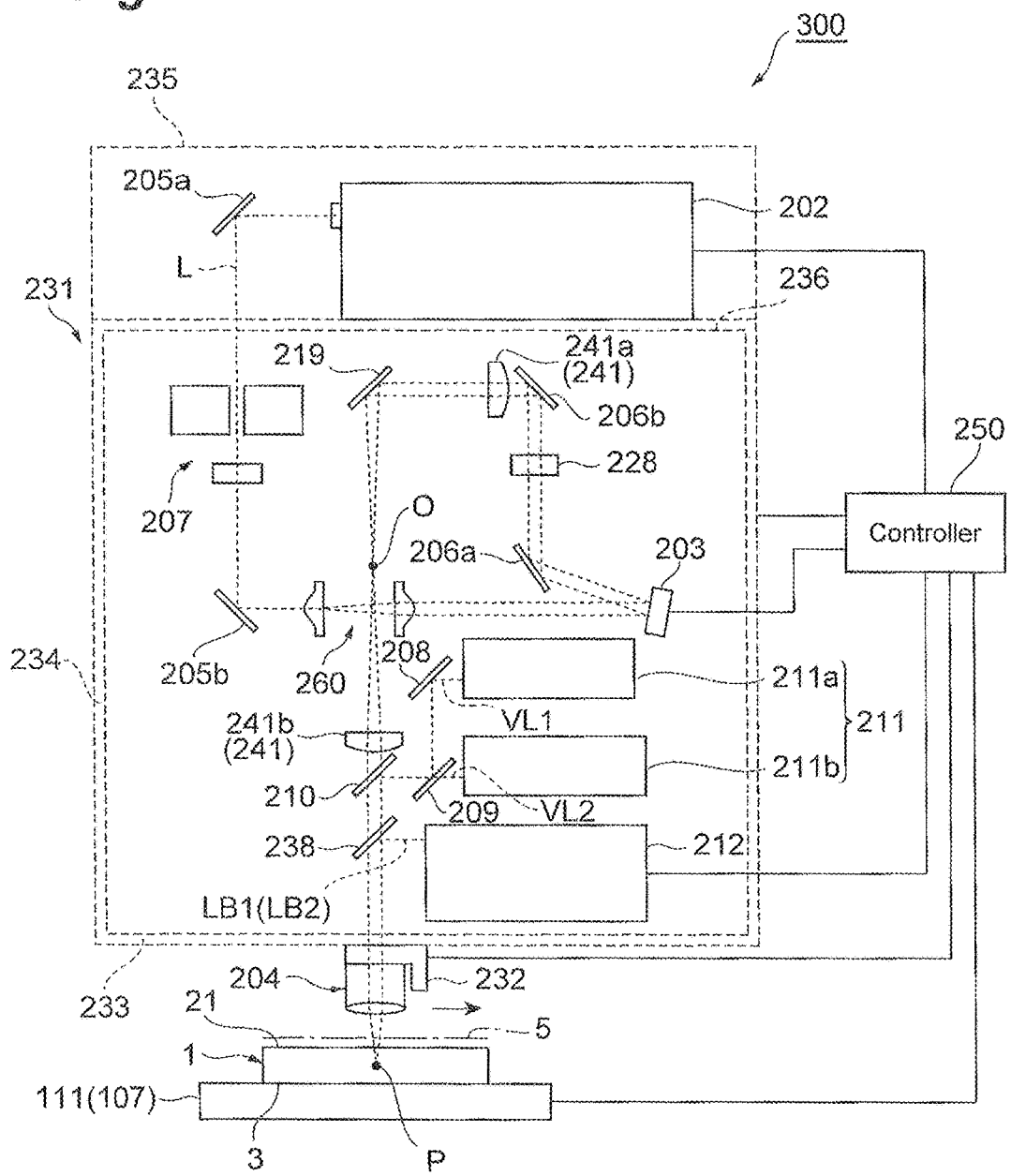
FIG. 7 is a schematic structural diagram illustrating the performing laser processing device in accordance with an embodiment.

FIG. 7 is a schematic structural diagram illustrating a laser processing device for performing the laser processing method in accordance with this embodiment. As illustrated in FIG. 7, the laser processing device 300 of this embodiment comprises a laser light source 202, a reflective spatial light modulator (aberration providing part) 203, a 4f optical system 241, and a converging optical system 204 within a housing 231. The laser light source 202, which emits laser light L having a wavelength of 1080 nm to 1200 nm, for example, uses a fiber laser, for instance. Here, the laser light source 202 is secured to a top plate 236 of the housing 231 with a screw and the like so as to emit the laser light L horizontally.

The laser light source 202 may emit short pulse laser light L or ultrashort pulse laser light L. The short pulse laser light L may have a pulse width of sub-ns to sub-ms, for example. When the ultrashort pulse laser light L has a pulse width less than sub-ns, there are cases where the pulse width is about 100 ps and about 10 ps. The laser light source 202 of this embodiment emits the ultrashort pulse laser light L. The beam profile of the laser light L may be a Gaussian form (so-called Gaussian beam) or a top-hat form (so-called top-hat beam). Here, the object 1 is irradiated with the laser light L having the top-hat form.

The reflective spatial light modulator 203, for which a reflective liquid crystal (LCOS: Liquid Crystal on Silicon) spatial light modulator (SLM) is used, for example, modulates the laser light L emitted from the laser light source 202. Here, the reflective spatial light modulator 203 modulates the laser light L horizontally incident thereon, while reflecting it obliquely upward with respect to the horizontal direction.

Figure 8:
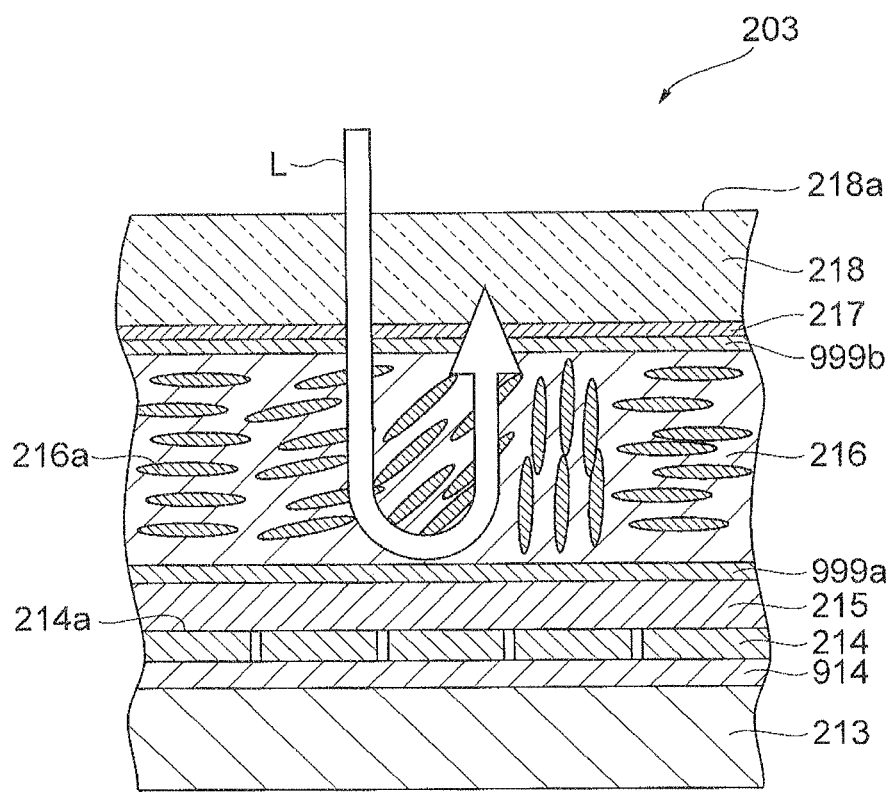
FIG. 8 is a partial sectional view of a reflective spatial light modulator.

FIG. 8 is a partial sectional view of the reflective spatial light modulator in the laser processing device of FIG. 7. As illustrated in FIG. 8, the reflective spatial light modulator 203 comprises a silicon substrate 213, a drive circuit layer 914, a plurality of pixel electrodes 214, a reflecting film 215 such as a dielectric multilayer mirror, an alignment film 999a, a liquid crystal layer (display part) 216, an alignment film 999b, a transparent conductive film 217, and a transparent substrate 218 such as a glass substrate, which are stacked in this order.

The transparent substrate 218 has a front face 218a extending along an XY plane, while the front face 218a constitutes a front face of the reflective spatial light modulator 203. The transparent substrate 218 is mainly composed of a light-transmitting material such as glass, for example, and transmits therethrough the laser light L having a predetermined wavelength incident thereon from the front face 218a of the reflective spatial light modulator 203 to the inside of the latter. The transparent conductive film 217 is formed on a rear face of the transparent substrate 218 and mainly composed of a conductive material (e.g., ITO) which transmits therethrough the laser light L.

The plurality of pixel electrodes 214 are arranged two-dimensionally according to the arrangement of a plurality of pixels on the silicon substrate 213 along the transparent conductive film 217. Each pixel electrode 214 is made of a metal material such as aluminum, for example, while its front face 214a is processed flat and smooth. The plurality of pixel electrodes 214 are driven by an active matrix circuit provided in the drive circuit layer 914.

The active matrix circuit is disposed between the plurality of pixel electrodes 214 and the silicon substrate 213 and controls the voltage applied to the pixel electrodes 214 according to a light image to be outputted from the reflective spatial light modulator 203. An example of such an active matrix circuit has a first driver circuit for controlling pixel rows each aligning in the X direction and a second driver circuit for controlling pixel columns each aligning in the Y direction, which are not depicted, and is constructed such that a controller 250 (which will be explained later) applies a predetermined voltage to the pixel electrode 214 of a pixel specified by both of the driver circuits.

The alignment films 999a, 999b are arranged on both end faces of the liquid crystal layer 216, respectively, so as to align a group of liquid crystal molecules in a fixed direction. As the alignment films 999a, 999b, those made of a polymer material such as polyimide, whose surfaces coming into contact with the liquid crystal layer 216 have been subjected to rubbing, for example, are employed.

The liquid crystal layer 216 is arranged between the plurality of pixel electrodes 214 and the transparent conductive film 217 and modulates the laser light L according to an electric field formed between each pixel electrode 214 and the transparent conductive film 217. That is, when the active matrix circuit applies a voltage to a given pixel electrode 214, an electric field is formed between the transparent conductive film 217 and this pixel electrode 214.

The electric field is applied to the reflecting film 215 and the liquid crystal layer 216 at a ratio of their respective thicknesses. The alignment direction of liquid crystal molecules 216a changes according to the magnitude of the electric field applied to the liquid crystal layer 216. The laser light L entering the liquid crystal layer 216 through the transparent substrate 218 and transparent conductive film 217, if any, is modulated by the liquid crystal molecules 216a while passing through the liquid crystal layer 216, then reflected by the reflecting film 215, and thereafter modulated again by the liquid crystal layer 216 before being taken out.

At this time, the controller 250, which will be explained later, applies a voltage to each of the pixel electrodes 214 opposing the transparent conductive film 217, whereby the refractive index in a part held between the transparent conductor film 217 and each of its opposing pixel electrodes 214 changes (the refractive index of the liquid crystal layer 216 at a position corresponding to each pixel changes). Such a change in refractive index can alter the phase of the laser light L for each pixel of the liquid crystal layer 216 according to the voltage applied. That is, a phase modulation corresponding to a hologram pattern can be imparted to the liquid crystal layer 216 for each pixel (i.e., the liquid crystal layer 216 of the reflective spatial light modulator 203 can be caused to display a modulation pattern as a hologram pattern providing a modulation).

As a result, the wavefront of the laser light L incident on and transmitted through the modulation pattern is adjusted, so that individual rays constituting the laser light L vary in phases of components in a predetermined direction orthogonal to their advancing direction. Therefore, appropriately setting the modulation pattern displayed in the reflective spatial light modulator 203 can modulate the laser light L (in terms of its intensity, amplitude, phase, and polarization, for example).

Figure 11:
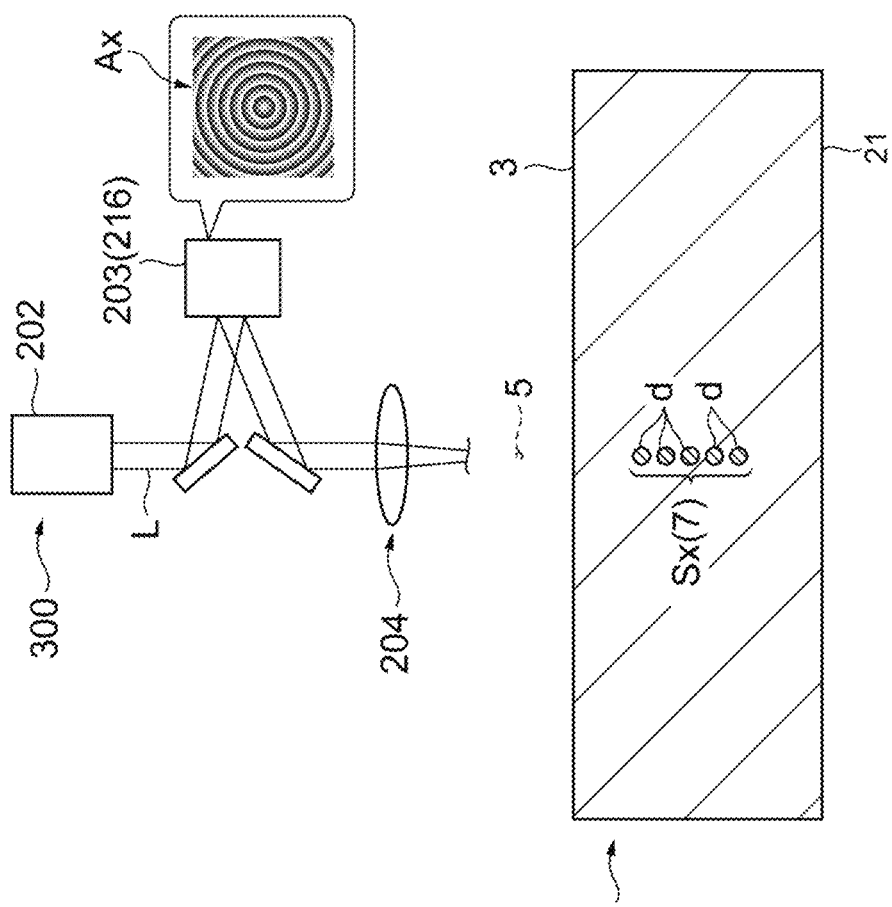
FIG. 11 is a schematic sectional view for explaining the laser processing method in accordance with a first embodiment.

As will be explained later, the reflective spatial light modulator 203 of this embodiment displays an axicon lens pattern as a modulation pattern in the liquid crystal layer 216, thereby modulating the laser light L, with which the object 1 is irradiated, such that the laser light L is converged at the object 1 so as to form converging points at a plurality of positions juxtaposed close to each other along the laser light irradiation direction. This forms, as illustrated in FIG. 11, modified dots d at the plurality of positions, respectively.

The plurality of modified dots d constitute one modified spot Sx to become a multipoint long modified spot. The modified spot Sx is elongated in the laser light irradiation direction (vertically long) as compared with a modified spot subjected to laser processing without displaying modulation patterns in the liquid crystal layer 216. That is, the plurality of modified dots d are densely juxtaposed close to each other in a row along the laser light irradiation direction, while the modified spot Sx formed by a series of the plurality of modified dots d has an elongated form which is longer in the laser light irradiation direction than in directions intersecting the former direction.

Returning to FIG. 7, the 4f optical system 241 adjusts the wavefront form of the laser light L modulated by the reflective spatial light modulator 203. The 4f optical system 241 has first and second lenses 241a, 241b. The lenses 241a, 241b are arranged between the reflective spatial light modulator 203 and the converging optical system 204 such that the distance between the reflective spatial light modulator 203 and the first lens 241a equals the focal length f1 of the first lens 241a, the distance between the converging optical system 204 and the second lens 241b equals the focal length f2 of the lens 241b, the distance between the first and second lenses 241a, 241b equals f1+f2, and the first and second lenses 241a, 241b constitute a double-telecentric optical system. This 4f optical system 241 can inhibit the laser light L modulated by the reflective spatial light modulator 203 from changing its wavefront form through spatial propagation and thereby increasing aberrations.

The converging optical system 204 converges the laser light L modulated by the 4f optical system 241 into the object 1. The converging optical system 204, which includes a plurality of lenses, is placed on a bottom plate 233 of the housing 231 while interposing therebetween a drive unit 232 including a piezoelectric device and the like.

In the laser processing device 300 constructed as in the foregoing, the laser light L emitted from the laser light source 202 advances horizontally within the housing 231 and then is reflected downward by a mirror 205a, whereupon its light intensity is adjusted by an attenuator 207. Then, the laser light L is reflected horizontally by a mirror 205h and, with its intensity distribution (hereinafter simply referred to as "intensity distribution") homogenized by a beam homogenizer 260, enters the reflective spatial light modulator 203.

The laser light L having entered the reflective spatial light modulator 203 passes through the modulation pattern displayed in the liquid crystal layer 216, so as to be modulated according to the modulation pattern, then is reflected upward by a mirror 206a, changes its polarization direction with a half-wave plate 228, and is horizontally reflected by a mirror 206b, so as to enter the 4f optical system 241.

The laser light L having entered the 4f optical system 241 has its wavefront form adjusted so as to be incident as parallel light on the converging optical system 204. Specifically, the laser light L converges by passing through the first lens 241a, is reflected downward by a mirror 219, diverges at a confocal point O, and passes through the second lens 241b, so as to be converged again to become parallel light. Then, the laser light L passes through dichroic mirrors 210, 238 in sequence, so as to enter the converging optical system 204, thereby being converged into the object 1 mounted on the stage 111.

The laser processing device 300 of this embodiment also comprises, within the housing 231, a surface observation unit 211 for observing the laser light entrance surface of the object 1 and an AF (AutoFocus) unit 212 for finely adjusting the distance between the converging optical system 204 and the object 1.

The surface observation unit 211 has an observation light source 211a for emitting visible light VL1 and a detector 211b for receiving and detecting reflected light VL2 of the visible light VL1 reflected by the laser light entrance surface of the object 1. In the surface observation unit 211, the visible light VL1 emitted from the observation light source 211a is reflected by or transmitted through a mirror 208 and dichroic mirrors 209, 210, 238, so as to be converged, by the converging optical system 204 to the object 1. The reflected light VL2 reflected by the laser light entrance surface of the object 1 is converged by the converging optical system 204, so as to be transmitted through or reflected by the dichroic mirrors 238, 210, and then transmitted through the dichroic mirror 209, so as to be received by the detector 211b.

The AF unit 212 emits AF laser light LB1 and receives and detects reflected light LB2 of the AF laser light LB1 reflected by the laser light entrance surface of the object 1, thereby acquiring displacement data of the laser light entrance surface along the line 5. Then, when forming the modified region 7, the AF unit 212 drives the drive unit 232 according to thus obtained displacement data, so as to move the converging optical system 204 to and fro in its optical axis direction along undulations of the laser light entrance surface of the object 1.

The laser processing device 300 further comprises the controller 250, constituted by CPU, ROM, RAM, and the like, for controlling the laser processing device 300. The controller 250 controls the laser light source 202, so as to adjust the output, pulse width, and the like of the laser light L emitted from the laser light source 202. When forming the modified region 7, the controller 250 controls at least one of the positions of the housing 231 and stage 111 and the driving of the drive unit 232 so that the converging point P of the laser light L relatively moves along the line 5 while being located at a predetermined distance from the front face 3 of the object 1.

When forming the modified region 7, the controller 250 applies a predetermined voltage to each electrode 214 in the reflective spatial light modulator 203, so as to cause the liquid crystal layer 216 to display a predetermined modulation pattern, thereby enabling the reflective spatial light modulator 203 to modulate the laser light L as desired.

Here, the modulation pattern displayed in the liquid crystal layer 216 is derived beforehand from the position to be formed with the modified region 7, the wavelength of the laser light L emitted, the material of the object 1, refractive indexes of the converging optical system 204 and object 1, and the like and stored in the controller 250. This modulation pattern includes at least one of an individual difference correction pattern for correcting individual differences occurring in the laser processing device 300 (e.g., distortions occurring in the liquid crystal layer 216 of the reflective spatial light modulator 203), a spherical aberration correction pattern for correcting a spherical aberration, and an axicon lens pattern.

Figure 9:
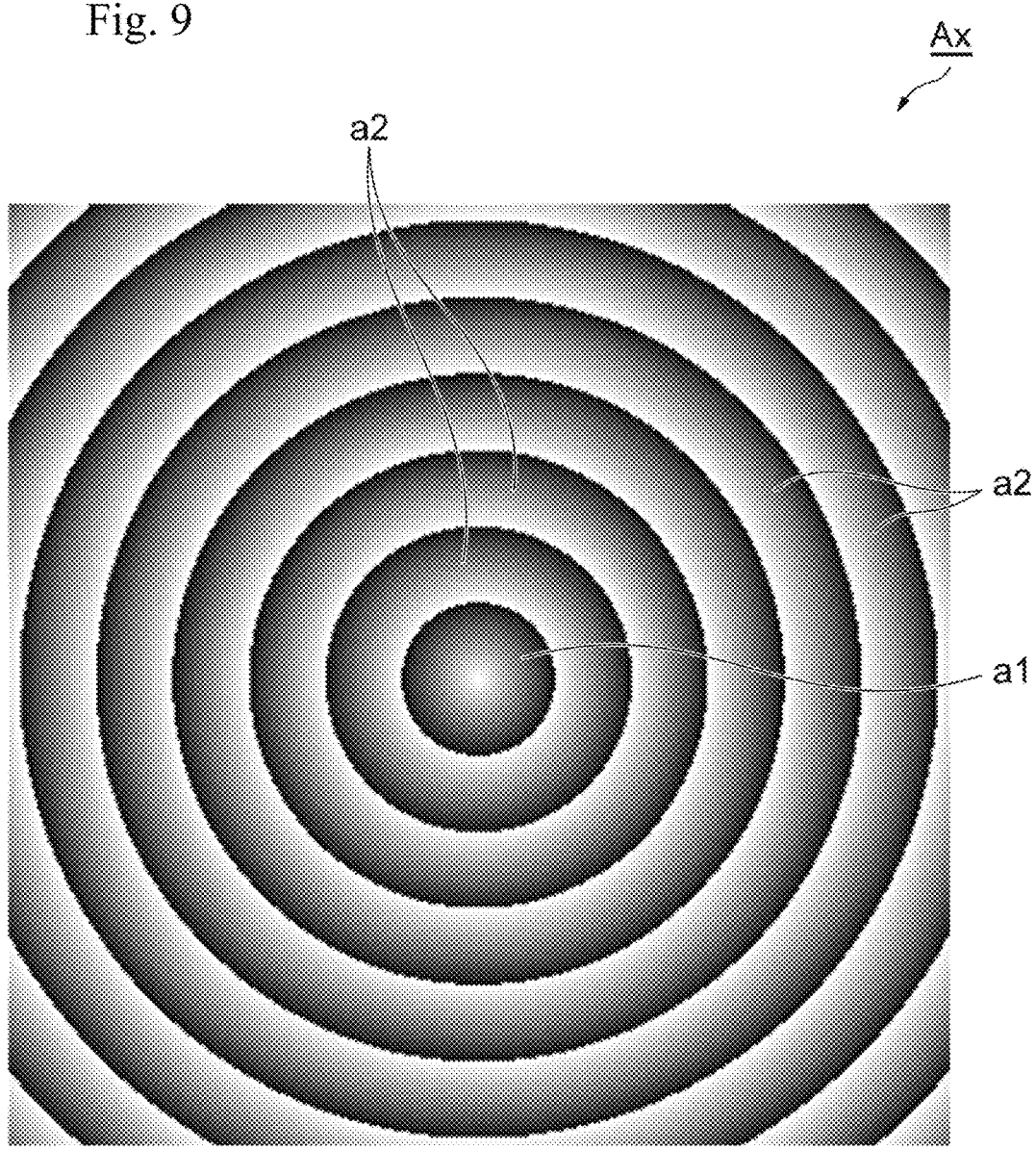
FIG. 9 is a diagram illustrating an axicon lens pattern displayed in a liquid crystal layer of the reflective spatial light modulator.

FIG. 9 is a diagram illustrating an axicon lens pattern displayed in the liquid crystal layer. The depicted axicon lens pattern Ax shows a state of the liquid crystal layer 216 in its front view. As illustrated in FIG. 9, the axicon lens pattern Ax is a modulation pattern generated so as to achieve an action of an axicon lens. The axicon lens pattern Ax converges the laser light L at the object 1 such that converging points are formed at a plurality of positions juxtaposed close to each other along the laser light irradiation direction. In other words, the laser light L is modulated so as to have a plurality of intensity distributions in the laser light irradiation direction (the propagation direction of the laser light, i.e., the optical axis direction). Here, the axicon lens pattern Ax is an inverted conical optical pattern which is downward convex.

Specifically, the axicon lens pattern Ax has a circular region a1 located at the center with respect to the incident laser light L and a plurality of circular ring regions a2 demarcated about the circular region a1. The circular ring regions 2a are formed concentrically with the circular region a1 and have circular ring forms with or without partial cutouts. The circular region a1 and plurality of circular ring regions a2 are configured such as to increase brightness gradually from their radially outer sides to inner sides.

When performing laser processing while causing the liquid crystal layer 216 to display the axicon lens pattern Ax, the number of converging points (number of modified dots d) juxtaposed close to each other along the laser light irradiation direction increases with a parameter number which is the number of circular ring regions a2 (the number of turns of brightness from the center), thereby forming the vertically long modified spot Sx corresponding to the parameter number. Here, as the parameter number increases and decreases, the number of modified dots d increases and decreases on the front side of (on the upstream side of) the laser light L, whereby the resulting modified spot Sx tends to expand and contract on the front side of the laser light L.

A laser processing method using the above-mentioned laser processing device 300 will now be explained in detail.

Figure 10:
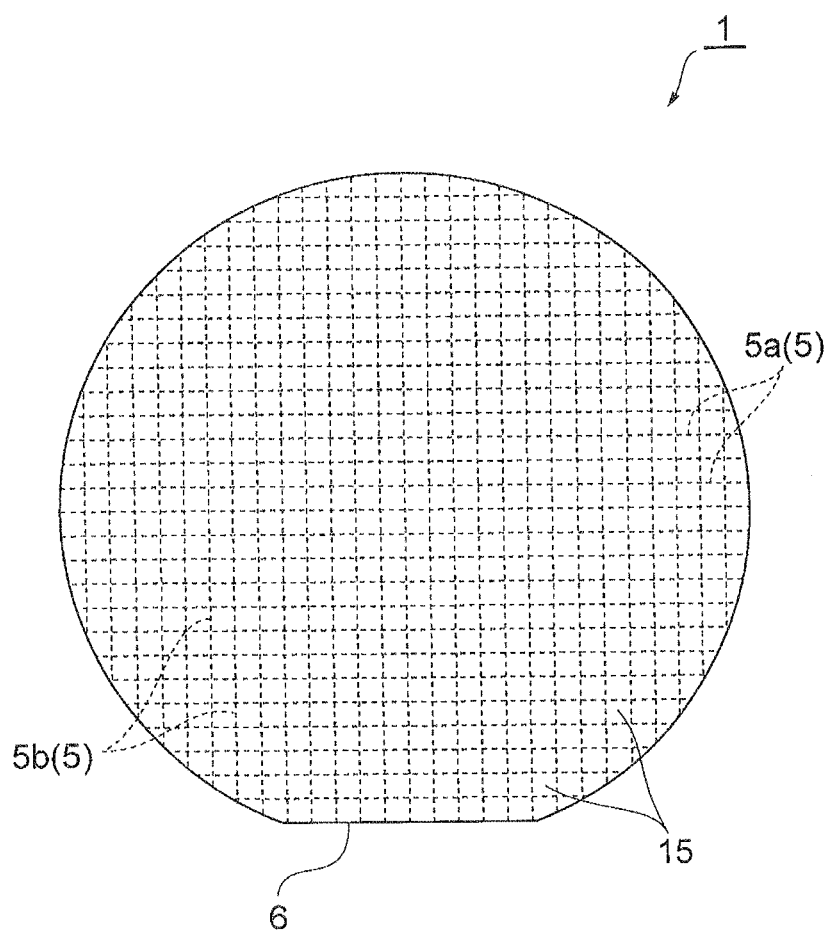
FIG. 10 is a plan view illustrating the object to be subjected to laser processing.

FIG. 10 is a plan view illustrating the object to be subjected to laser processing in accordance with this embodiment, while FIG. 11 is a sectional view for explaining the laser processing method in this embodiment. The laser processing method of this embodiment is used as a chip manufacturing method for manufacturing a plurality of chips by laser-processing the object 1. As illustrated in FIG. 10, the object 1, examples of which include silicon substrates, sapphire substrates, SiC substrates, glass substrates (tempered glass substrates), semiconductor substrates, and transparent insulated substrates, has a planar form. The thickness of the object 1, which may be 150 μm to 350 μm, is 200 μm or 250 μm here.

The front face 3 of the object 1 is provided with a plurality of functional device formation regions 15 arranged in a matrix. A plurality of lines to cut 5 extending so as to pass between the functional device formation regions 15 adjacent to each other are set on the front face 3 of the object 1. The plurality of lines 5 extend like grids and include lines to cut 5a, 5b which extend along directions substantially parallel and perpendicular to an orientation flat 6 of the object 1, respectively. When the object 1 is a sapphire substrate, its c-plane is taken as principal surfaces (the front face 3 and rear face 21), and the lines 5 are configured so as to extend in directions along the r-plane of the sapphire substrate.

First, when laser-processing the object 1, an expandable tape is attached to the rear face 21 of the object 1, and the object 1 is mounted on the stage 111. Subsequently, as illustrated in FIGS. 7 and 11, the controller 250 controls the reflective spatial light modulator 203, so as to cause the liquid crystal layer 216 to display the axicon lens pattern Ax as a modulation pattern, whereupon the object 1 is irradiated with the laser light L in a pulsating manner while using the front face 3 of the object 1 as a laser light entrance surface (laser light irradiation surface) and converging the laser light L at the object 1 so as to form converging points at a plurality of positions juxtaposed close to each other along the laser light irradiation direction. At the same time, the object 1 and the laser light L are relatively moved (scanned) along the lines 5.

This forms a plurality of vertically long modified spots Sx, each having modified dots d formed at a plurality of positions juxtaposed close to each other along the laser light irradiation direction, along the lines 5 at a predetermined depth in the thickness direction of the object 1. The plurality of modified spots Sx form the modified region 7. Thereafter, the expandable tape is expanded, so as to cut the object 1 along the lines 5 from the modified region 7 acting as a cutting start point, whereby a plurality of cut chips are obtained as semiconductor devices (examples of which include memories, IC, light-emitting devices, and light-receiving devices).

When forming the modified spot Sx, the following axicon lens pattern production step (axicon lens pattern production control) may be performed. In the axicon lens pattern production step, the controller 250 produces the axicon lens pattern Ax, for example, according to a state of a normal modified spot formed within the object 1 without causing the liquid crystal layer 216 to display the modulation pattern (which may simply be referred to as "normal modified spot" in the following).

There are cases where the modified spot Sx varies its length in the laser light irradiation direction depending on the material of the object 1 and the energy of the laser light L, thereby changing its position in the thickness direction. Therefore, the following converging point position correction step (converging point position correction control) may be performed when forming the modified spot Sx.

With reference to the deepest position (position closest to the rear face 21) of the laser light L concerning the modified spot Sx to be formed, the converging point position correction step corrects the converging point position (Z height) of the laser light in the thickness direction according to the state of the normal modified spot, for example. This is because the modified spot Sx tends to expand and contract on the front side of the laser light L according to the parameter number.

When forming the modified spot Sx, an axicon lens pattern adjustment step (axicon lens pattern adjustment control) for adjusting the parameter number of the axicon lens pattern Ax (the number of circular ring regions a2) may be performed. In the axicon lens pattern adjustment step, the parameter number of the axicon lens pattern Ax is set according to the state of the normal modified spot, for example, so as to correspond to the length in the laser light irradiation direction of the modified spot Sx (modified region 7) to be formed. Specifically, the parameter number is made greater and smaller when the modified spot Sx is to be formed longer and shorter in the laser light irradiation direction, respectively.

When the converging part of the laser light L in the object 1 is made vertically long so as to form the vertically long modified region 7 in the object 1, the amount of fractures (cracks) occurring within the object 1 decreases, so as to improve the straightness in cut sections and the bending strength, thereby yielding a possibility of improving the processing quality. While this may lower the energy density at the converging part of the laser light L, thereby causing fears of failing to form the modified region 7 itself and requiring a large amount of energy for processing, it is found that such fears can be coped with by modulating the laser light L as appropriate by using the reflective spatial light modulator 203.

In this regard, when forming the modified region 7, this embodiment causes the reflective spatial light modulator 203 to display the axicon lens pattern Ax as a modulation pattern, thereby converging the laser light so as to form converging points at a plurality of positions juxtaposed close to each other in the laser light irradiation direction. That is, the longitudinally fine multipoint-diverged laser light L can perform laser processing (so-called simultaneous multipoint elongation processing), so as to connect the diverged multipoint converging points to each other, thereby forming a pseudo vertically long converging spot. This can form the modified spot Sx having a plurality of modified dots d juxtaposed close to each other in the laser light irradiation direction.

This modified spot Sx forms a simulatively (and substantially) vertically long converging part while fully keeping its energy density, thereby producing the vertically long modified region 7. This can reduce the number of fractures occurring within the object 1 and make the fractures harder to extend, thereby improving the straightness in cut sections and the bending strength and making it possible to improve the processing quality.

The modified region 7 becomes vertically long and thus can improve throughput. This embodiment can reduce the number of fractures and thus is effective in particular when the fractures within the object 1 are to be controlled (e.g., when the lines 5 do not align with the crystal orientation or when a glass material is to be processed).

The above-mentioned operation and effect that it can reduce the amount of fractures is remarkably effective in decreasing fractures in the c-plane direction when the object 1 is an SiC substrate or sapphire substrate. While an optical system using an axicon lens to make converging points vertically long typically lowers the energy density so that normal processing is difficult or a large amount of energy is necessary for processing, this embodiment can converge the laser light L while fully keeping the energy density. Since the spatial phase modulator 203 is used for forming the vertically long modified spot Sx, the modified region 7 can instantaneously be formed with a given pitch at a given position.

When the object 1 is a sapphire substrate taking the c-plane as a principal surface, fractures are typically hard to extend along the r-plane in the sapphire substrate. Therefore, when the modified region 7 is formed along the line 5 extending along the r-plane, resulting fractures are easy to extend in directions intersecting the line 5, thereby yielding a fear of breaking along directions intersecting the line 5. By contrast, this embodiment can reduce the amount of fractures and thus can suppress the fear, thereby being effective in particular when the line 5 is set so as to extend in a direction along the r-plane of the sapphire substrate. The above-mentioned operation and effect of improving the processing quality is remarkable when the object 1 is amorphous glass.

Figure 12:
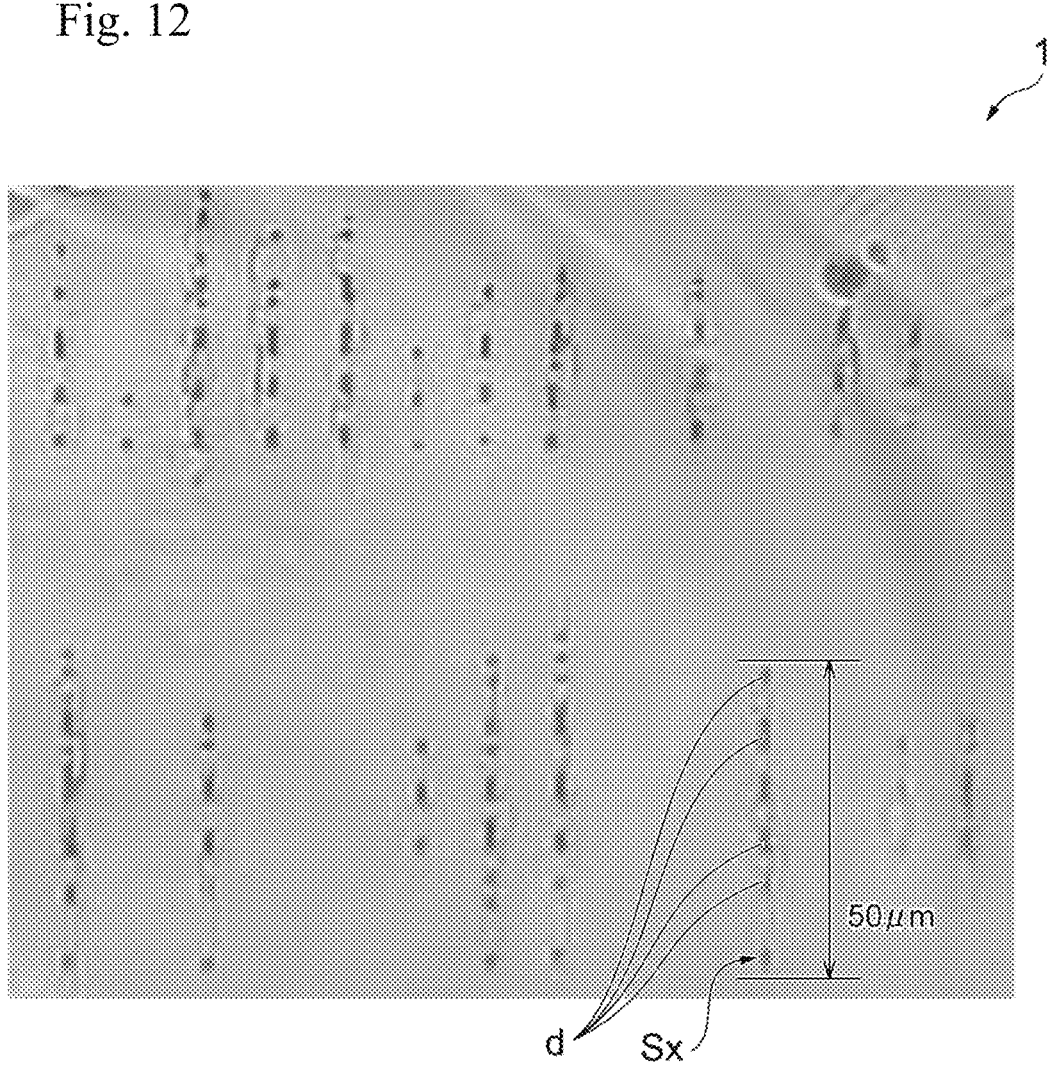
FIG. 12 is a photograph illustrating an example of modified spots formed by the laser processing method in accordance with the first embodiment.

FIG. 12 is a photograph illustrating an example of modified spots formed by the laser processing method of this embodiment. FIG. 12 illustrates the object 1 as seen from a side, while the depicted vertical direction corresponds to the thickness direction. It can be seen from FIG. 12 that converging points are formed at a plurality of positions juxtaposed close to each other in the laser light irradiation direction, whereby the vertically long modified spot Sx having a plurality of modified dots d juxtaposed close to each other in the laser light irradiation direction is made.

FIG. 13 is a photograph for explaining effects of the laser processing method of this embodiment. FIG. 13(a) is a picture in which the object 1 is irradiated with the laser light L while no modulation pattern is displayed in the liquid crystal layer 216, so as to form modified spots Sy within the object 1. FIG. 13(b) is a picture in which the object 1 is irradiated with the laser light L while the axicon lens pattern Ax is displayed in the liquid crystal layer 216, so as to form the modified spot Sx within the object 1. The pictures in FIG. 13 illustrate the inside of the object 1 formed with the modified spots as seen from the laser light entrance surface.

It can be seen from FIG. 13 that the vertically long modified spot Sx formed while the axicon lens pattern Ax is displayed in the liquid crystal layer 216 can reduce the amount of fractures occurring within the object 1 as compared with the modified spots Sy formed while no modulation pattern is displayed in the liquid crystal layer 216.

FIG. 14 is another photograph for explaining effects of the laser processing method of this embodiment. FIG. 14(a) illustrates a cut section 25y at the time when the object 1 is irradiated with the laser light L while no modulation pattern is displayed in the liquid crystal layer 216. FIG. 14(b) illustrates a cut section 25x at the time when the object 1 is irradiated with the laser light L while the axicon lens pattern Ax is displayed in the liquid crystal layer 216. FIG. 14 illustrates the object 1 as seen from a side, while the depicted vertical direction corresponds to the thickness direction.

It can be seen from FIG. 14 that laser processing with the axicon lens pattern Ax tends to reduce fractures extending in directions intersecting the thickness direction, for example, in particular, whereby the straightness at chip end faces improves in the cut section 25x as compared with that in the cut section 25y formed by laser processing without displaying modulation patterns in the liquid crystal layer 216.

The following will illustrate results of measurement of bending strength concerning a chip produced by laser-processing the object 1 without displaying modulation patterns in the liquid crystal layer 216 and a chip produced by laser-processing the object 1 while displaying the axicon lens pattern Ax in the liquid crystal layer 216. Here, a load is exerted on the laser light entrance surface side.

Displaying no modulation pattern: bending strength 75.3 MPa

Displaying the axicon lens pattern: bending strength 109.6 MPa

It can be seen from the above-mentioned bending strength measurement results that laser processing with the axicon lens pattern Ax improves the bending strength of the chip as compared with the laser processing without displaying modulation patterns in the liquid crystal layer 216.

The first embodiment will now be explained in more detail.

As mentioned above, the laser processing device 300 comprises the reflective spatial light modulator 203 as an aberration providing part and causes the reflective spatial light modulator 203 to perform a phase modulation for the laser light L converged at the object 1, so as to impart an aberration to the laser light L (see FIG. 7). Therefore, a principle by which the aberration occurs and the phase modulation will be explained at first.

Figure 15:
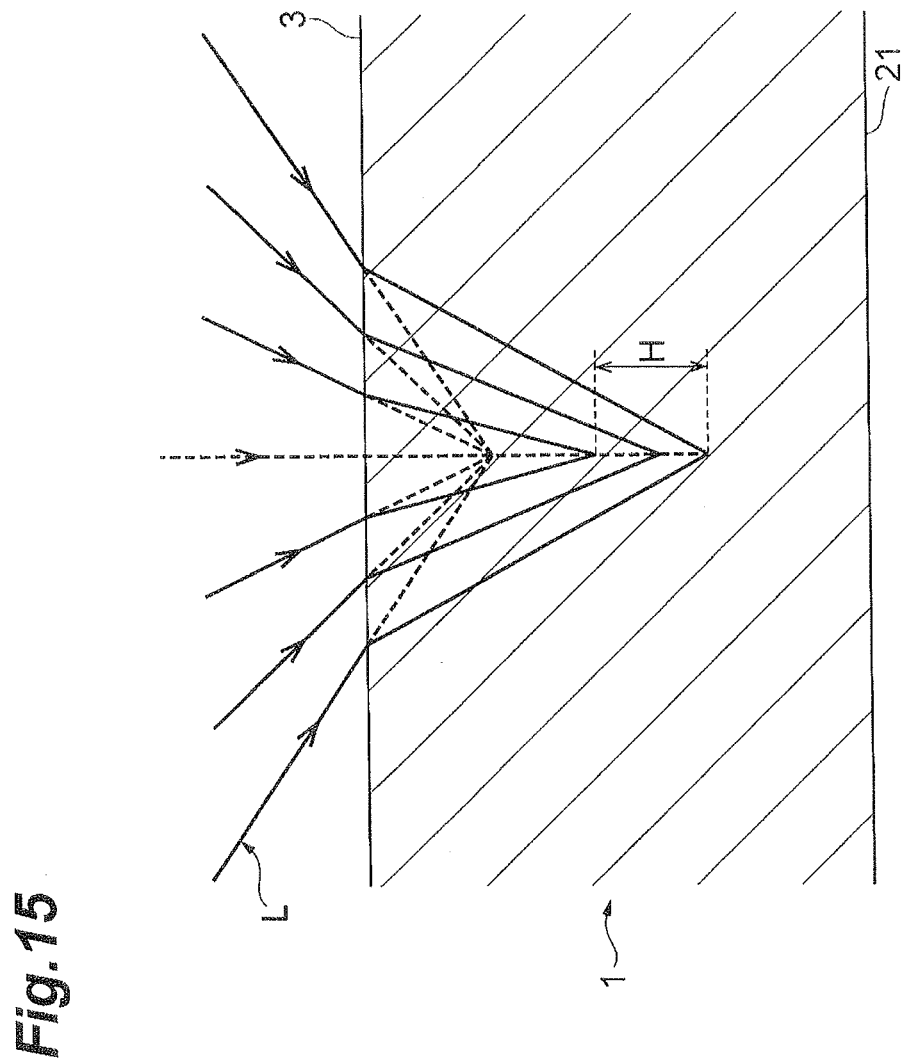
FIG. 15 is a diagram for explaining aberrations occurring at converging positions of laser light.

FIG. 15 is a diagram for explaining aberrations occurring at converging positions of laser light. The laser light L converges geometrically at a single point when it is a plane wave (has a planar wavefront (phase)). On the other hand, while the plane-wave laser light L typically changes its wavefront under various influences, the laser light L converged at the object 1 may fail to converge at the single point, i.e., aberrations may occur naturally. Examples of the aberrations include Seidel aberrations (astigmatism, coma, spherical aberration, curvature of field, and distortion), longitudinal aberration which is an aberration in the longitudinal direction (along the optical axis direction), and lateral aberration which is an aberration in a direction intersecting the longitudinal direction.

When the laser light L is made incident on the object 1 by the converging optical system 204 (see FIG. 11) and the like in the process of being converged at the object 1, a spherical aberration in which light beams having different angles of incidence converge at different positions by refraction (Snell's law) naturally occurs as illustrated in FIG. 15, for example. That is, as depicted, since the laser light L is converged at the object 1, an aberration occurs naturally at the converging position independently of the reflective spatial light modulator 203, whereby a range of the aberration along the optical axis direction (a range where the intensity of the laser light L is a processing threshold α or greater) exists as a reference aberration range H.

It is found that adding a new aberration to the aberration including a spherical aberration and the like caused by such converging of the laser light L (hereinafter referred to as "converging-induced aberration") can control the processing quality. An example of techniques for adding the new aberration is a phase modulation of the laser light L with the reflective spatial light modulator 203. By the phase modulation is meant modulating a wavefront (phase) of the laser light L into a given form.

Examples of the phase modulation include those achieving an action of an axicon lens, attaining an action of a diffraction grating, and generating a predetermined spherical aberration. These examples can be performed by causing the reflective spatial light modulator 203 to display an axicon lens pattern, a diffraction grating pattern, and a predetermined spherical aberration pattern, respectively, for instance. As a technique for adding a new aberration, a lens providing an aberration may be used, or a medium may be inserted in the process of converging, while each of the lens and medium constitutes the aberration providing part in such a case.

Returning to FIG. 7, the reflective spatial light modulator 203 causes its liquid crystal layer 216 to display the modulation pattern, so as to phase-modulate the laser light L converged at the object 1, thereby controlling the intensity distribution of the laser light at the converging position in the optical axis direction. In other words, the reflective spatial light modulator 203 freely controls the intensity distribution at the converging position in the optical axis direction by laser wavefront control.

The reflective spatial light modulator 203 imparts a first aberration to the laser light L such that it has an elongated range longer than the reference aberration range H (see FIG. 15) in the optical axis direction as an aberration range and an intensity distribution in the optical axis direction with a continuous undulation in the elongated range HL. Specifically, as will be explained in the following, the reflective spatial light modulator 203 of this embodiment combines (adds together) the converging-induced aberration caused by the converging of the laser light L and the first aberration that is a spherical aberration (longitudinal aberration) achieving an action of an axicon lens.

FIG. 16 is a chart for explaining intensity distributions of laser light in the optical axis direction in this embodiment. FIGS. 16(a), 16(b), and 16(c) illustrate respective intensity distributions caused by the converging-induced aberration alone, by the aberration provided by the axicon lens pattern Ax alone, and by the combination of the converging-induced aberration and the aberration provided by the axicon lens pattern Ax. The abscissa in each chart indicates the position in the optical axis direction, which is 0 at the laser light entrance surface and increases the depth from the laser light entrance surface of the object 1 as it advances toward the right side of the chart. The scales of ordinates in the charts are set independently of each other and do not always coincide with each other. These explanations in the charts also apply to FIGS. 20, 23, and 26 which will follow.

As illustrated in FIG. 16(a), the laser light L has an intensity distribution K1 caused by the converging-induced aberration. In the intensity distribution K1, unevenness occurs on the shallow position side, and a range of aberration which is a range yielding the processing threshold α or greater is the reference aberration range H. On the other hand, the reflective spatial light modulator 203 causes the liquid crystal layer 216 to display the axicon lens pattern Ax, so as to subject the laser light L to a phase modulation according to an action of a positive axicon lens, thereby imparting an intensity distribution K2 having unevenness on the deeper position side (see FIG. 16(b)) to the laser light L. Therefore, as illustrated in FIG. 16(c), the intensity distributions K1, K2 act in combination in this embodiment, whereby the laser light L has an intensity distribution K3.

As compared with the intensity distribution K1, the intensity distribution K3 has an elongated range HL which suppresses its unevenness so as to be in balance and is elongated in the optical axis direction so as to be longer than the reference aberration range H. In addition, the intensity distribution K3 has a continuous undulation in the elongated range HL. In other words, in the intensity distribution K3, the range yielding the processing threshold α or greater is elongated in the optical axis direction, so as to become the elongated range HL, while its value undulates like a sawtooth as the position in the optical axis direction changes (increases or decreases the depth). As the amount of aberration provided by the axicon lens pattern Ax is greater, its defocused components shift the peak of the intensity distribution K2 toward the shallower side in the optical axis direction, whereby the elongated range HL tends to expand.

When the laser light L having the intensity distribution K3 is converged at the object 1, an energy density is fully kept while employing the elongated range HL as a converging part, so that multipoint converging points corresponding to the continuous undulation in the intensity distribution K3 are formed so as to be juxtaposed close to each other in the optical axis direction, for example. As a result, the modified spot Sx having a plurality of modified dots d (see FIG. 11) is formed as the modified region 7 in a vertically long range corresponding to the elongated range HL in the optical axis direction.

For attaining the first aberration, the laser processing device 300 generates a modulation pattern in the controller 250 according to the reference aberration range H determined from a processing depth (a position at which the modified region 7 is formed in the optical axis direction) inputted and a processing length (the length of the modified region 7 in the optical axis direction) inputted. The liquid crystal layer 216 is caused to display the generated modulation pattern (as will be explained later in detail).

FIG. 17 is a chart illustrating an example of data tables stored in the controller of this embodiment. As illustrated in FIG. 17, the controller 250 has data tables Tb1, Tb2 for generating the modulation pattern to be displayed in the liquid crystal layer 216 of the reflective spatial light modulator 203. As illustrated in FIG. 17(a), the data table Tb1 associates processing depths $Z_1$ to $Z_3$ inputted from an input unit (not depicted) connected to the controller 250 with reference aberration ranges $H_1$ to $H_3$, respectively. As illustrated in FIG. 17(b), the data table Tb2 associates processing lengths $X_1$ to $X_3$ inputted from the input unit and the reference aberration ranges $H_1$ to $H_3$ with modulation patterns $A_1$ to $A_3$.

Figure 18:
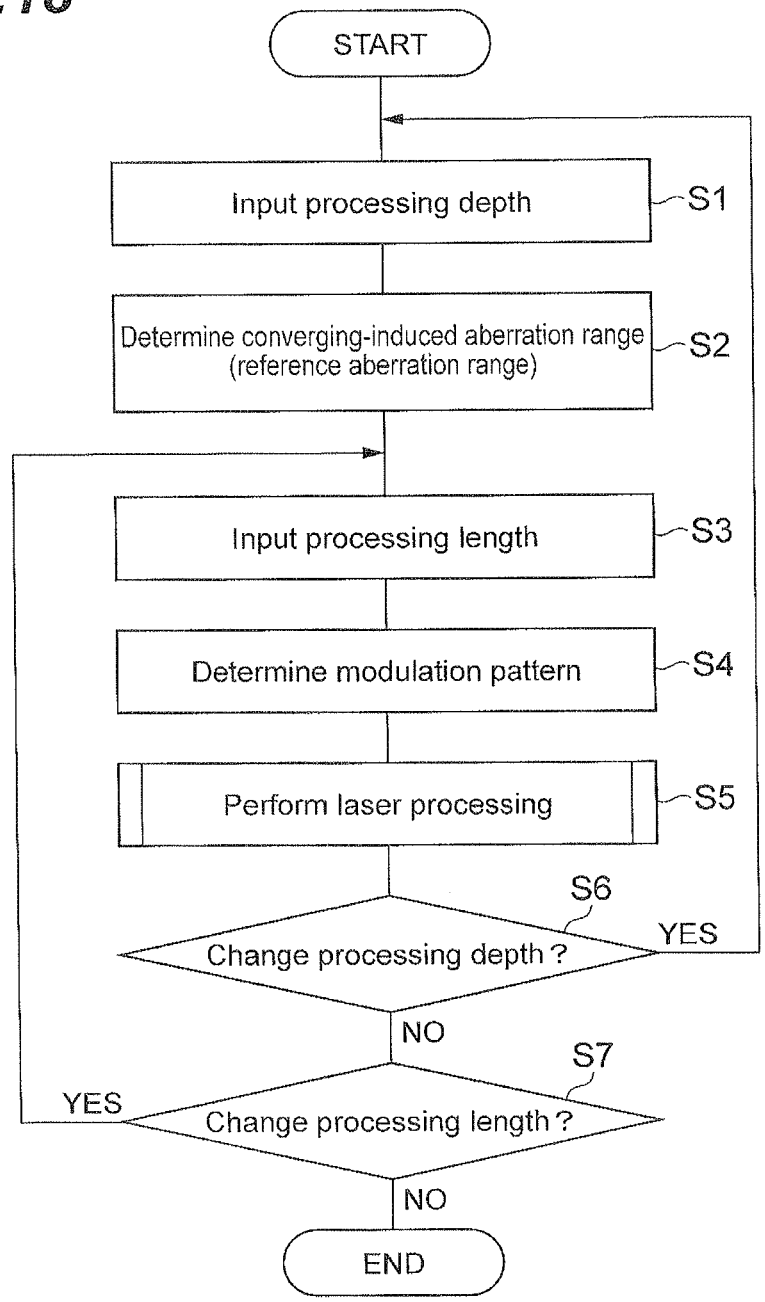
FIG. 18 is a flowchart illustrating an example of the laser processing method in accordance with the first embodiment.

FIG. 18 is a flowchart illustrating an example of the laser processing method performed by the laser processing device of this embodiment. As illustrated in FIG. 18, the processing depth of the modified region 7 to be formed is inputted from the input unit in the laser processing device 300 (S1). Subsequently, the data table Tb1 is referred to in the controller 250, so as to determine the reference aberration range H, which is the range of converging-induced aberration, according to the inputted processing depth (S2).

Next, the processing length of the modified region 7 to be formed is inputted from the input unit (S3). Subsequently, the data table Tb2 is referred to in the controller 250, so as to determine, according to the inputted processing length and the reference aberration range H determined at the above-mentioned S2, a modulation pattern to be displayed in the liquid crystal layer 216 of the reflective spatial light modulator 203 (S4). Then, while this modulation pattern is displayed in the liquid crystal layer 216, the ultrashort pulse laser light L is converged at the object 1, whereby the above-mentioned laser processing is performed (S5).

As a consequence, the first aberration, which is a spherical aberration caused by a phase modulation achieving an action of an axicon lens, is added to the converging-induced aberration, whereby an elongation effect caused by the addition occurs in the intensity distribution of the laser light L. That is, the laser light L having the elongated range HL as the range of aberration with a continuous undulation in the elongated range HL (see FIG. 16(c)) is converged at the object 1. Therefore, the part where the laser light L is converged in the object 1 becomes vertically long while fully keeping its energy density, whereby converging points of the laser light are formed at multipoint positions juxtaposed close to each other along the optical axis direction. As a result, the vertically long modified spot Sx having a plurality of modified dots d juxtaposed close to each other in the optical axis direction is formed, whereby the vertically long modified region 7 is produced.

When the inputted processing depth is changed after starting the laser processing of the above-mentioned S5, the flow shifts again to the processing of the above-mentioned S1 (S6). When the inputted processing length is changed after starting the laser processing of the above-mentioned S5, the flow shifts again to the processing of the above-mentioned S3 (S7).

In this embodiment, as in the foregoing, the object 1 is laser-processed by the ultrashort pulse laser light having the elongated range HL longer than the reference aberration range H as the aberration range and an intensity distribution along the optical axis direction with a continuous undulation in the elongated range HL. This can elongate the converging part of the laser light effectively and properly along the optical axis direction in the object 1, thereby forming the vertically long modified region 7 in the object 1. This can ameliorate the straightness in cut sections, suppress adverse effects (fractures in cleavage planes and c-plane) caused by the cleavage characteristic and crystal orientation of the object 1, inhibit fractures from fluctuating, and raise the bending strength, for example, thereby making it possible to improve the processing quality.

This embodiment can produce converging points as a plurality of points juxtaposed close to each other in the optical axis direction, which makes it possible to form the modified region 7 like a perforation. This makes it easier to cut the object 1 along the modified region 7 and enables laser processing independent of the cleavage characteristic and crystal orientation. Such converging at a plurality of points enables laser processing to be performed with an amount of energy smaller than that in the case of converging at a single vertically long converging spot, thereby making it easier to secure a sufficient energy density even when forming the modified region 7 within the object 1 at a position which is deep from the laser light entrance surface, so that the modified region 7 having a sufficient size (large width) can securely be formed.

With respect to one converging point, another converging point is located nearby in the optical axis direction, so as to enhance the destructive force in the object 1 at the time of cutting, whereby the object 1 can be cut easily. The latter converging point also brings a heat-inducing effect to the former converging point, whereby the object 1 can be cut easily. This can further enhance a destressing effect at the time when the laser light L modifies the object 1, whereby the object 1 can be cut easily.

This embodiment adds the aberration caused by the phase modulation achieving an action of an axicon lens as the first aberration to the converging-induced aberration occurring. This makes it possible to yield the intensity distribution K3 having a continuous undulation, in the elongated range HL while elongating the aberration range to the elongated range HL.

Figure 19:
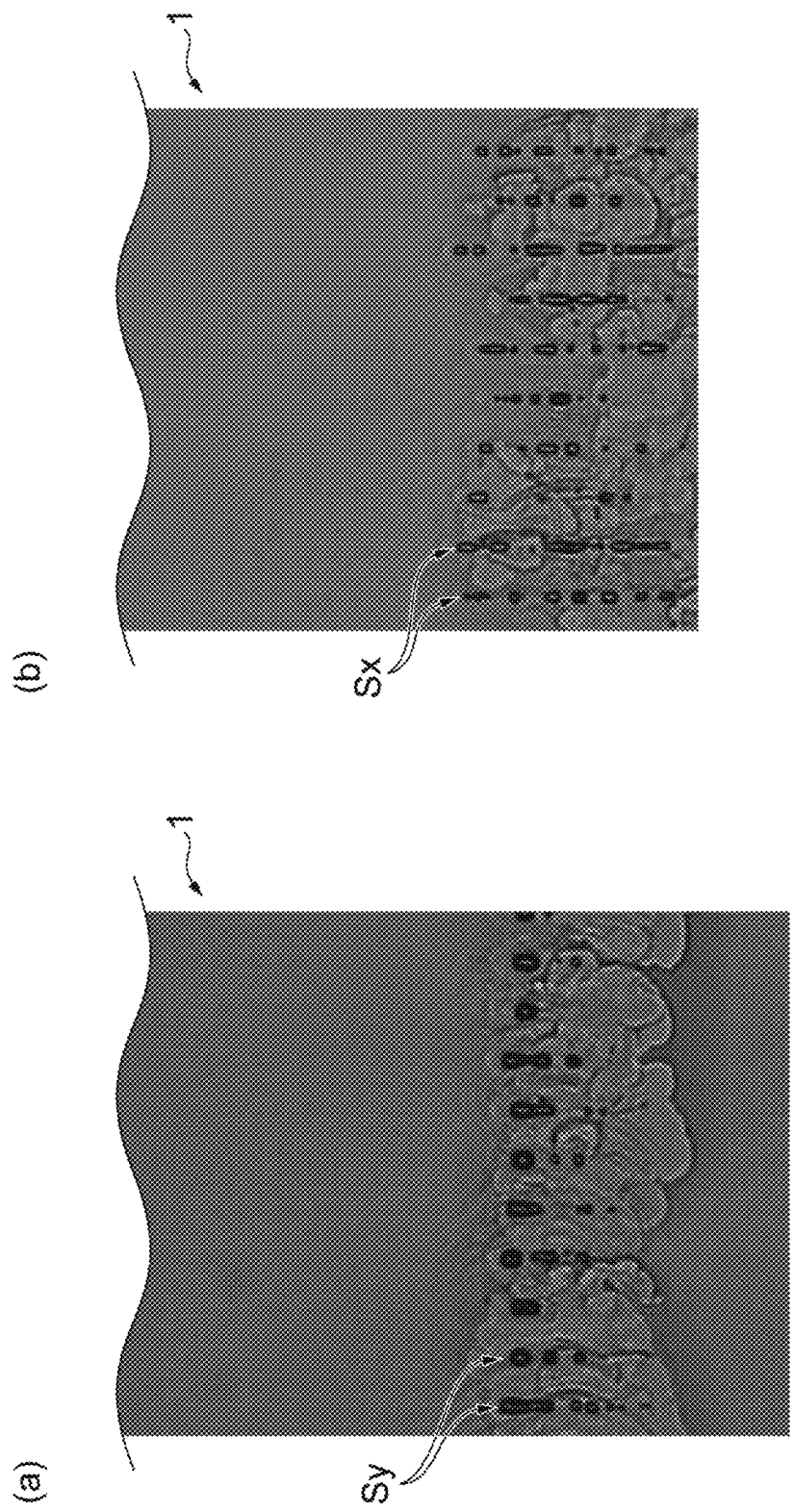
FIG. 19 is still another photograph for explaining effects of the laser processing method in accordance with the first embodiment.

FIG. 19 is still another photograph for explaining effects of the laser processing method of this embodiment. FIG. 19(a) is a picture in which modified spots Sy are formed within the object 1 by converging the laser light L having the converging-induced aberration without displaying modulation patterns in the liquid crystal layer 216. FIG. 19(b) is a picture in which modified spots Sx are formed within the object 1 by converging the laser light L having the intensity distribution K3 (see FIG. 16(c)) formed by adding the aberration achieving an action of an axicon lens to the converging-induced aberration by displaying the axicon lens pattern Ax in the liquid crystal layer 216.

Each picture of FIG. 19 illustrates the object 1 formed with the modified spots Sx, Sy as seen from a cut section, while the depicted vertical direction corresponds to the optical axis direction. In each picture of FIG. 19, a plurality of modified spots Sy, Sx (modified regions 7) are juxtaposed in the depicted lateral direction. The laser processing of FIG. 19(h) uses the axicon lens pattern Ax corresponding to 5k.

It can be seen from FIG. 19 that the modified spots Sx in accordance with this embodiment are elongated in the optical axis direction so as to become vertically longer as compared with the reference modified spots Sy formed by converging the laser light L having the reference aberration range H. It can also be seen that the modified spots Sx of this embodiment are formed by a greater number of multipoint converging points along the optical axis direction than those in the modified spots Sy.

The second embodiment will now be explained in detail. This embodiment will be explained mainly in terms of differences from the above-mentioned first embodiment.

As will be explained in the following, the reflective spatial light modulator 203 of this embodiment combines a predetermined spherical aberration as the first aberration with the converging-induced aberration caused by the converging of the laser light L. FIG. 20 is a chart for explaining the intensity distribution of laser light in the optical axis direction in this embodiment. FIGS. 20(a), 20(b), and 20(c) illustrate respective intensity distributions caused by the converging-induced aberration alone, by the aberration provided by a predetermined spherical aberration pattern alone, and by the combination of the converging-induced aberration and the predetermined spherical aberration pattern.

As illustrated in FIGS. 20(a) and 20(b), while the laser light L has the intensity distribution K1 because of the converging-induced aberration, the reflective spatial light modulator 203 causes its liquid crystal layer 126 to display a predetermined spherical aberration pattern, so as to perform a phase modulation according to the predetermined spherical aberration, thereby imparting an intensity distribution K4 to the laser light L converged. Consequently, as illustrated in FIG. 20(c), the intensity distributions K1, K4 act so as to combine with each other, whereby the laser light L has an intensity distribution K5. As compared with the intensity distribution K1, the intensity distribution K5 is elongated in the optical axis direction and has an elongated range HL as an aberration range with a continuous undulation in the elongated range HL.

As in the foregoing, this embodiment also exhibits the above-mentioned operation and effect that it can improve the processing quality. By adding a predetermined spherical aberration to the converging-induced aberration occurring, this embodiment can obtain the intensity distribution K5 having a continuous undulation in the elongated range HL while elongating the aberration range to the elongated range HL.

Figure 21:
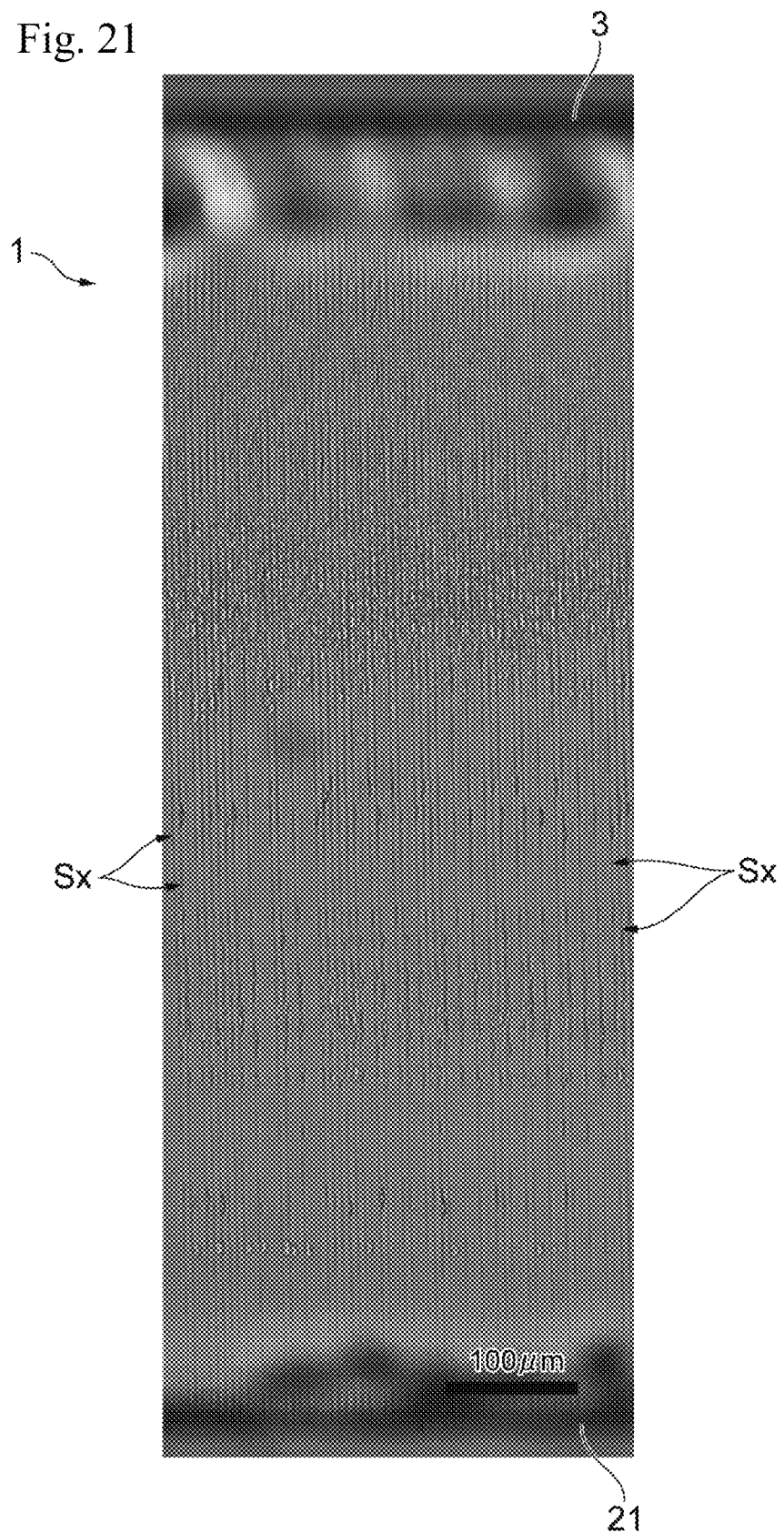
FIG. 21 is a photograph for explaining effects of the laser processing method in accordance with the second embodiment.
Figure 22:
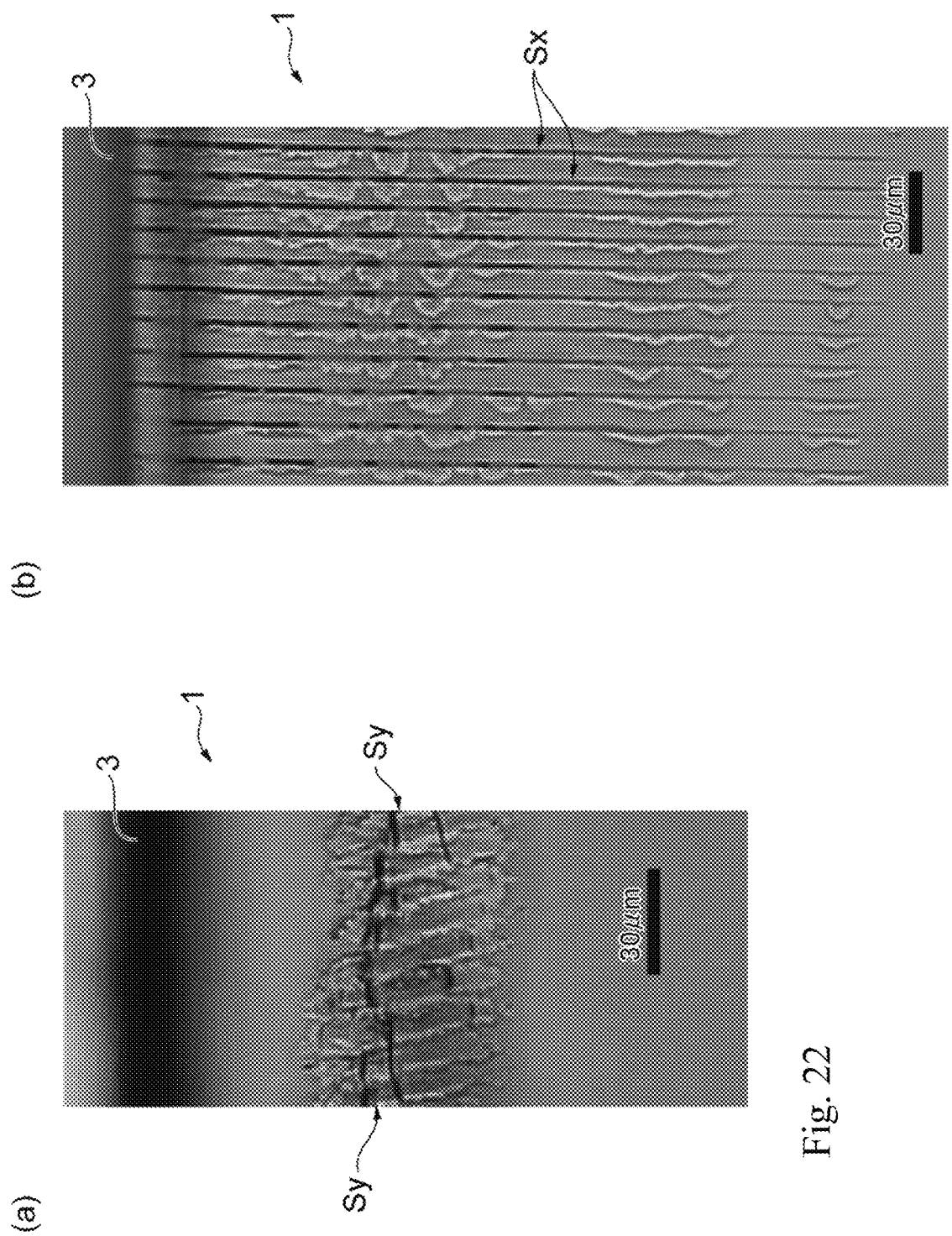
FIG. 22 is another photograph for explaining effects of the laser processing method in accordance with the second embodiment.

FIGS. 21 and 22 are photographs for explaining effects of the laser processing method in accordance with this embodiment. FIG. 22(a) is a picture in which modified spots Sy are formed within the object 1 by converging the laser light L having the converging-induced aberration without displaying modulation patterns in the liquid crystal layer 216. FIG. 22(b) is a picture in which modified spots Sx are formed within the object 1 by converging the laser light L having the intensity distribution K5 (see FIG. 20(c)) formed by adding a predetermined spherical aberration to the converging-induced aberration by displaying the predetermined spherical aberration in the liquid crystal layer 216.

FIGS. 21 and 22 illustrate transmission photographs of the object 1 after laser processing before cutting. In each picture of FIG. 22, a plurality of modified spots Sy, Sx (modified regions 7) are juxtaposed in the depicted lateral direction. Here, the laser processing condition is set as follows, for example. That is, the ultrashort pulse laser light L has a pulse width of about 10 ps and a wavelength of 1064 nm. Glass is used as the object 1.

It can be seen from FIGS. 21 and 22(b) that this embodiment forms the vertically long modified spots Sx, which are very fine linear processing scars, straightly in the thickness direction with favorable accuracy and quality. It can also be seen that the modified spots Sx are elongated in the optical axis direction so as to become vertically longer as compared with the modified spots Sy formed by laser processing without providing the predetermined spherical aberration.

The third embodiment will now be explained in detail. This embodiment will be explained mainly in terms of differences from the above-mentioned second embodiment.

As will be explained in the following, the reflective spatial light modulator 203 of this embodiment combines a predetermined spherical aberration as the first aberration with the converging-induced aberration caused by the converging of the laser light L and removes unnecessary components generating unevenness in an intensity distribution included in this aberration. FIG. 23 is a chart for explaining the intensity distribution of laser light in the optical axis direction in this embodiment. FIGS. 23(a), 23(b), and 23(c) illustrate respective intensity distributions caused by the converging-induced aberration alone, by the combination of the converging-induced aberration and the predetermined spherical aberration pattern, and by the combination of the converging-induced aberration and the predetermined spherical aberration after removing the unnecessary components.

As illustrated in FIGS. 23(a) and 23(b), while the laser light L has the intensity distribution K1 because of the converging-induced aberration, the reflective spatial light modulator 203 causes its liquid crystal layer 216 to display a predetermined spherical aberration pattern, whereby the laser light L has the intensity distribution K5 as its intensity distribution. In addition, the reflective spatial light modulator 203 processes, alters (changes), synthesizes, or regenerates the predetermined spherical aberration pattern so as to remove unnecessary components of the aberration, for example. Consequently, as illustrated in FIG. 23(e), the laser light L has an intensity distribution K5' which is homogenized by eliminating strong unevenness in the optical axis direction.

In the laser processing device 300 of this embodiment, the controller 250 determines a modulation pattern and an amount of unnecessary components according to inputted processing depth and processing length, and laser processing is performed according to the modulation pattern and unnecessary component amount (as will be explained later in detail).

FIG. 24 is a chart illustrating an example of data tables stored in the controller of this embodiment. As illustrated in FIG. 24, the controller 250 has a data table Tb3. The data table Tb3 is used for acquiring the modulation pattern and unnecessary component amount according to the processing depth and processing length. The data table Tb3 associates inputted processing depths $Z_1$ to $Z_3$ and processing lengths $X_1$ to $X_3$ with unnecessary component amounts $F_{1,1}$ to $F_{3,3}$ and modulation patterns $A_{1,1}$ to $A_{3,3}$.

Figure 25:
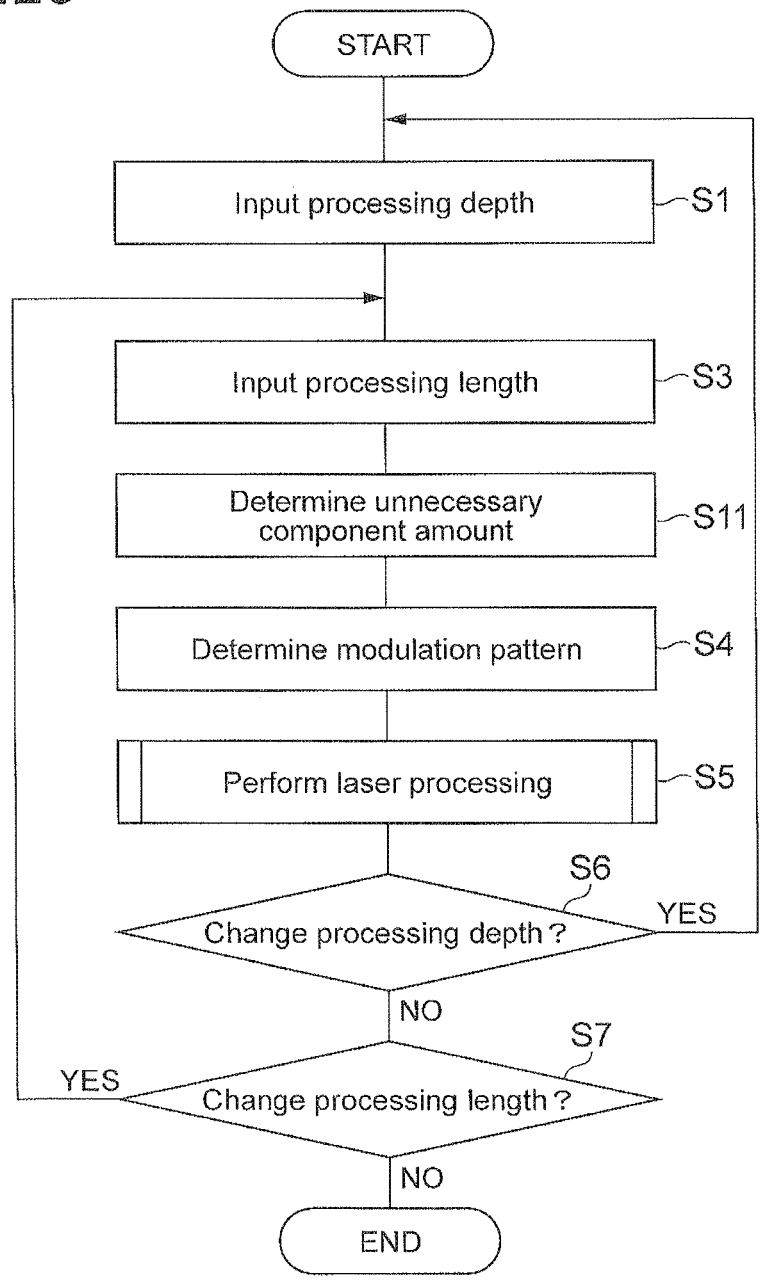
FIG. 25 is a flowchart illustrating an example of the laser processing method in accordance with the third embodiment.

FIG. 25 is a flowchart illustrating an example of the laser processing method performed in the laser processing device of this embodiment. In this embodiment, as illustrated in FIG. 25, after the above-mentioned S3 at which the processing length of the modified region 7 to be formed is inputted, the controller 250 refers to the data table Tb3, so as to determine the unnecessary component amount according to the processing depth and processing length (S11).

At the above-mentioned S4 thereafter, the controller 250 refers to the data table Tb3, so as to generate a modulation pattern according to the inputted processing depth and processing length, and processes, alters (changes), synthesizes, or regenerates the modulation pattern so as to remove unnecessary components by the unnecessary component amount determined at the above-mentioned S11. This determines the modulation pattern.

As in the foregoing, this embodiment also exhibits the above-mentioned operation and effect that it can improve the processing quality. This embodiment also removes unnecessary components which generate unevenness in the intensity distribution included in the aberration of the elongated range. This can homogenize the intensity distribution K5 (see FIG. 23(b)) in the optical axis direction by eliminating unevenness therein, thereby converging the laser light L having the intensity distribution K5' (see FIG. 23(c)) at the object 1.

The fourth embodiment will now be explained in detail. This embodiment will be explained mainly in terms of differences from the above-mentioned first embodiment.

As will be explained in the following, before combining a spherical aberration caused by a phase modulation for achieving an action of an axicon lens as the first aberration with the converging-induced aberration, the reflective spatial light modulator 203 of this embodiment provides a second aberration concerning a spherical aberration correction (aberration correction) for correcting the converging-induced aberration. FIG. 26 is a chart for explaining intensity distributions of laser light in the optical axis direction of this embodiment. FIGS. 26(a), 26(b), and 26(c) illustrate respective intensity distributions caused by the converging-induced aberration alone, obtained after the spherical aberration correction, and provided with the aberration caused by the axicon lens pattern Ax and the predetermined spherical aberration after the spherical aberration correction.

As illustrated in FIGS. 26(a) and 26(b), while the laser light L has the intensity distribution K1 because of the converging-induced aberration, the reflective spatial light modulator 203 applies a spherical aberration correction (e.g., a spherical aberration of 100 μm) for correcting the converging-induced aberration to the laser light L, so as to converge the laser light L ideally, whereby the laser light L has an intensity distribution K6 as its intensity distribution. In the optical axis direction, the intensity distribution K6 has a peak which rises and falls steeply.

In addition, the reflective spatial light modulator 203 causes its liquid crystal layer 216 to display a modulation pattern which achieves an action of a combination of an axicon lens and a predetermined spherical aberration, so as to subject the laser light L to a phase modulation. As a consequence, the laser light L has an intensity distribution K7 illustrated in FIG. 26(c). As compared with the intensity distribution K1, the intensity distribution K7 is longer while suppressing its unevenness, so as to have the elongated range HL as an aberration range with a continuous undulation in the elongated range HL.

FIG. 27 is a chart illustrating an example of data tables stored in the controller of this embodiment. As illustrated in FIG. 27, the controller 250 has data tables Tb4, Tb5. The data table Tb4 is used for acquiring a correction amount for the spherical aberration correction according to the processing depth. The data table Tb5 is used for generating a modulation pattern to be displayed in the liquid crystal layer 216 according to the processing length and the correction amount for the spherical aberration correction. As illustrated in FIG. 27(a), the data table Tb4 associates inputted processing depths $Z_1$ to $Z_3$ with correction amounts $Q_1$ to $Q_3$. As illustrated in FIG. 27(b), the data table Tb5 associates inputted processing lengths $X_1$ to $X_3$ and the correction amounts $Q_1$ to $Q_3$ with modulation patterns $A_{1,1}$ to $A_{3,3}$.

Figure 28:
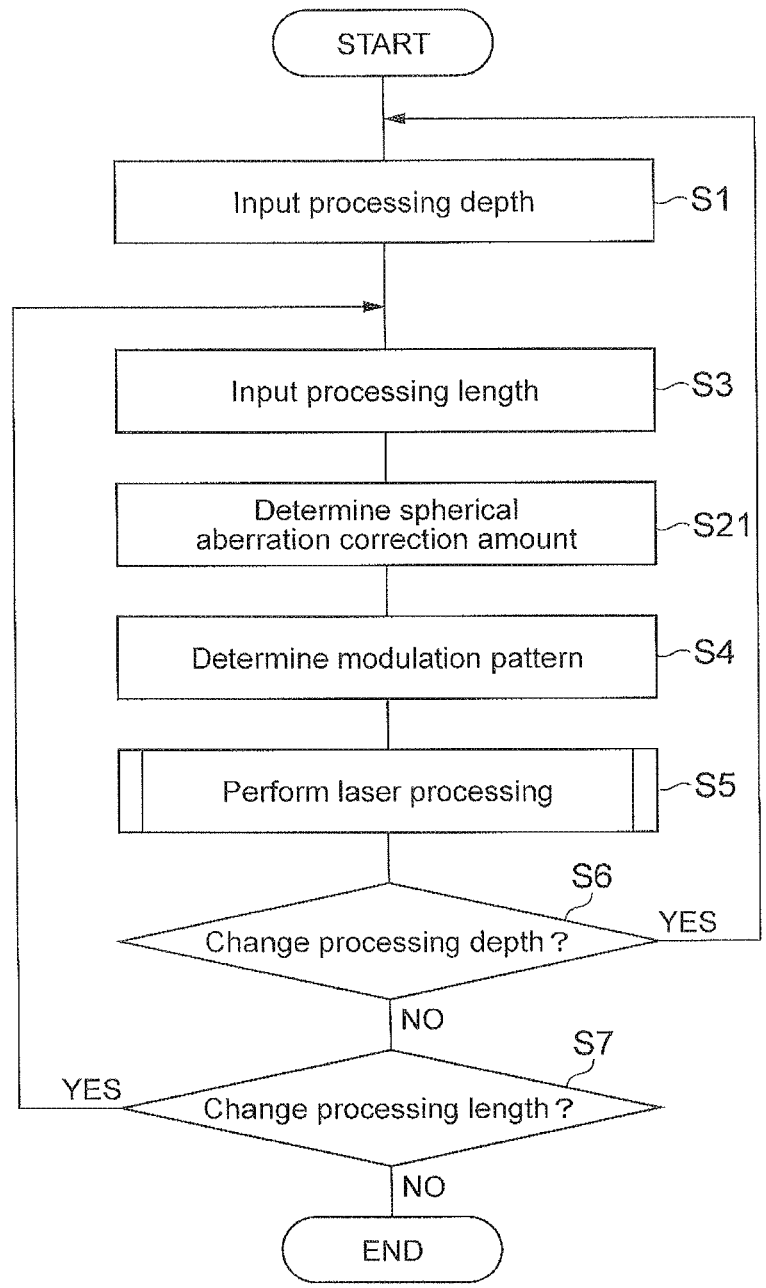
FIG. 28 is a flowchart illustrating an example of the laser processing method in accordance with the fourth embodiment.

FIG. 28 is a flowchart illustrating an example of the laser processing method performed in the laser processing device of this embodiment. In this embodiment, as illustrated in FIG. 28, after the above-mentioned. S3 at which the processing length of the modified region 7 to be formed is inputted, the data table Tb4 is referred to in the controller 250, so as to determine the spherical aberration correction amount according to the inputted processing depth (S21). At the above-mentioned S4 thereafter, the data table Tb5 is referred to in the controller 250, so as to generate and determine a modulation pattern achieving the above-mentioned first and second aberrations according to the inputted processing length and the correction amount determined at the above-mentioned S21.

As in the foregoing, this embodiment also exhibits the above-mentioned operation and effect that it can improve the processing quality. This embodiment also performs spherical aberration correction for correcting the converging-induced aberration. This can ideally converge the laser light L once and elongate the aberration range in the optical axis direction to the elongated range HL.

Though embodiments in accordance with one aspect of the present invention are explained in the foregoing, the present invention is not limited to the above-mentioned embodiments but may be modified or applied to others within the scope not changing the gist set forth in each claim.

Modes of laser processing in the above-mentioned embodiments are not limited; for example, so-called stealth dicing which forms the modified region 7 only within the object 1 or so-called entire-surface modification which forms the modified region 7 extending along the thickness direction so as to be exposed to both of the laser light entrance surface and the surface opposite thereto in the object 1 may be performed. So-called full-cut processing which forms respective fractures exposed to the laser light entrance surface and the surface opposite thereto from the modified region may also be performed, for example.

Though the above-mentioned embodiments employ the front face 3 and rear face 21 as the "laser light entrance surface" and "the surface opposite to the laser light entrance surface," respectively, the front face 3 becomes the "surface opposite to the laser light entrance surface" when the rear face 21 is the "laser light entrance surface." In the above-mentioned embodiments, a plurality of rows of modified regions 7 may be formed in the thickness direction. In this case, the plurality of rows of modified regions 7 may be formed in any order. The present invention can also be regarded as a chip manufactured by the above-mentioned laser processing device or method.

INDUSTRIAL APPLICABILITY

One aspect of the present invention can provide a laser processing device and laser processing method which can improve the processing quality.

REFERENCE SIGNS LIST

1: object to be processed; 3: front face (laser light entrance surface); 21: rear face (surface opposite to the laser light entrance surface); 7: modified region; 100, 300: laser processing device; 101, 202: laser light source; 203: reflective spatial light modulator (aberration providing part); 204: converging optical system; H: reference aberration range; HL: elongated range; L: laser light.

The invention claimed is:

1. A laser processing device for forming a modified region in an object to be processed by converging ultrashort pulse laser light at the object, the laser processing device comprising:
    a laser light source emitting the laser light;
    a spatial light modulator being an aberration providing part imparting an aberration to the laser light emitted from the laser light source at the object; and
    a converging optical system converging the laser light modulated by the spatial light modulator at the object;
    wherein the spatial light modulator is provided on a light path between the laser light source and the converging optical system,
    in an optical axis direction of the laser light, letting a reference aberration range be a range of a converging-induced aberration as an aberration naturally occurring while no phase modulation is performed by the spatial light modulator at a position where the laser light is converged as a result of converging the laser light at the object,
    the spatial light modulator imparts a first aberration to the laser light such that the laser light converged at the object by the converging optical system has an elongated range longer than the reference aberration range in the optical axis direction as an aberration range and an intensity distribution in the optical axis direction with a continuous undulation in the elongated range.

2. A laser processing device according to claim 1, wherein the aberration providing part imparts the first aberration to the laser light so as to form converging points of the laser light at a plurality of positions juxtaposed close to each other along the optical axis direction.

3. A laser processing device according to claim 1, wherein the aberration providing part provides an aberration caused by a phase modulation achieving an action of an axicon lens as the first aberration.

4. A laser processing device according to claim 1, wherein the aberration providing part imparts a predetermined spherical aberration as the first aberration to the laser light.

5. A laser processing device according to claim 1, wherein the aberration providing part removes or adjusts an unnecessary component causing unevenness in the intensity distribution contained in the aberration.

6. A laser processing device according to claim 1, wherein the aberration providing part imparts a second aberration concerning an aberration correction for correcting the converging-induced aberration to the laser light.

7. A laser processing device according to claim 1, wherein the object contains glass; and
    wherein the ultrashort pulse laser light has a pulse width of 100 ps or less.

8. A laser processing method for forming a modified region in an object to be processed by converging ultrashort pulse laser light at the object, the laser processing method comprising the steps of:
- emitting the laser light from a laser light source and imparting an aberration to the emitted laser light by the spatial light modulator; and
- converging the laser light modulated by the spatial light modulator at the object;
- wherein the spatial light modulator is provided on a light path between the laser light source and the converging optical system,
- in an optical axis direction of the laser light, letting a reference aberration range be a range of a converging-induced aberration as an aberration naturally occurring while no phase modulation is performed by the spatial light modulator at a position where the laser light is converged as a result of converging the laser light at the object,
- the step of imparting the aberration to the laser light imparts a first aberration to the laser light such that the laser light converged at the object by the converging optical system has an elongated range longer than the reference aberration range in the optical axis direction as an aberration range and an intensity distribution in the optical axis direction with a continuous undulation in the elongated range.

9. A laser processing method according to claim 8, wherein the step of imparting the aberration to the laser light imparts the first aberration to the laser light so as to form converging points of the laser light at a plurality of positions juxtaposed close to each other along the optical axis direction.

10. A laser processing method according to claim 8, wherein the step of imparting the aberration to the laser light provides an aberration caused by a phase modulation achieving an action of an axicon lens as the first aberration.

11. A laser processing method according to claim 8, wherein the step of imparting the aberration to the laser light provides a predetermined spherical aberration as the first aberration to the laser light.

12. A laser processing method according to claim 8, wherein the step of imparting the aberration to the laser light imparts a second aberration for removing or adjusting an unnecessary component causing unevenness in the intensity distribution contained in the aberration to the laser light.

13. A laser processing method according to claim 8, wherein the step of imparting the aberration to the laser light imparts a second aberration concerning an aberration correction for correcting the converging-induced aberration to the laser light.

14. A laser processing method according to claim 8, wherein the object contains glass; and
- wherein the ultrashort pulse laser light has a pulse width of 100 ps or less.

* * * * *